United States Patent
Morioka et al.

(10) Patent No.: US 9,648,205 B2
(45) Date of Patent: May 9, 2017

(54) IMAGE GENERATION DEVICE, IMAGING DEVICE, IMAGE GENERATION METHOD, AND PROGRAM FOR GENERATING A NEW IMAGE FROM A CAPTURED IMAGE BASED ON A CUT-OUT FRAME

(71) Applicant: Panasonic Intellectual Property Management Co., Ltd., Osaka (JP)

(72) Inventors: Yoshihiro Morioka, Nara (JP); Kenichi Kubota, Osaka (JP); Hideaki Hatanaka, Kyoto (JP); Eiji Yamauchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 35 days.

(21) Appl. No.: 14/761,017

(22) PCT Filed: Feb. 26, 2014

(86) PCT No.: PCT/JP2014/001005
§ 371 (c)(1),
(2) Date: Jul. 15, 2015

(87) PCT Pub. No.: WO2014/155962
PCT Pub. Date: Oct. 2, 2014

(65) Prior Publication Data
US 2015/0350488 A1    Dec. 3, 2015

(30) Foreign Application Priority Data
Mar. 26, 2013  (JP) ................................. 2013-063447

(51) Int. Cl.
*H04N 5/232*      (2006.01)
*H04N 1/387*      (2006.01)
(Continued)

(52) U.S. Cl.
CPC ....... *H04N 1/3875* (2013.01); *H04N 5/23219* (2013.01); *H04N 5/23254* (2013.01);
(Continued)

(58) Field of Classification Search
CPC .. H04N 5/2628; H04N 1/3875; H04N 5/2621; H04N 5/772; H04N 5/23219;
(Continued)

(56) References Cited

U.S. PATENT DOCUMENTS

2008/0111889 A1* 5/2008 Fujita ..................... H04N 5/145
                                                                                    348/208.5
2010/0103192 A1   4/2010 Fukumoto et al.
(Continued)

FOREIGN PATENT DOCUMENTS

JP    2009-147727    7/2009
JP    2010-103884    5/2010

OTHER PUBLICATIONS

International Search Report issued Apr. 1, 2014 in International (PCT) Application No. PCT/JP2014/001005.

*Primary Examiner* — Hung Lam
(74) *Attorney, Agent, or Firm* — Wenderoth, Lind & Ponack, L.L.P.

(57) ABSTRACT

An image generating device has a camerawork information extracting unit that extracts imaging information of a captured image, a composition information calculating unit that temporarily decides a cut-out frame for cutting out a new image from the imaging information and the captured image based on a constraint condition, and decides a cut-out frame to smooth a change of the new image between frames, from the temporarily decided cut-out frame, each of the frames being a unit of an image, and a composition information shaping unit that cuts out the new image from the captured image by using the cut-out frame, and converts a size of the (Continued)

new image to a predetermined size. The new image generated from the captured image becomes a favorable image that is easy to see for a viewer, and particularly a more smooth and natural image, without any skilled imaging techniques during capturing.

5 Claims, 18 Drawing Sheets

(51) Int. Cl.
*H04N 5/91* (2006.01)
*H04N 5/77* (2006.01)
*H04N 5/262* (2006.01)

(52) U.S. Cl.
CPC ....... *H04N 5/23296* (2013.01); *H04N 5/2621* (2013.01); *H04N 5/772* (2013.01); *H04N 5/91* (2013.01)

(58) Field of Classification Search
CPC ........ H04N 5/91; G06K 9/00369; G06T 7/20; G06T 2207/10016
See application file for complete search history.

(56) References Cited

U.S. PATENT DOCUMENTS

| | | | |
|---|---|---|---|
| 2011/0007175 A1 | 1/2011 | Fujita et al. | |
| 2013/0051662 A1* | 2/2013 | Shiozaki | G06K 9/00228 382/159 |
| 2013/0343604 A1* | 12/2013 | Adachi | G06K 9/00711 382/103 |
| 2015/0002546 A1* | 1/2015 | Nakao | H04N 1/387 345/634 |
| 2015/0016683 A1* | 1/2015 | Kinoshita | H04N 5/23219 382/103 |
| 2015/0116517 A1* | 4/2015 | Kinoshita | H04N 5/23219 348/208.6 |
| 2015/0125032 A1* | 5/2015 | Yamanaka | H04N 5/232 382/103 |

\* cited by examiner

FIG. 8

| Kind of constraint | Constraint condition |
|---|---|
| Cut-out frame | Cut-out frame size |
| | Degree of change in cut-out frame size between frames |
| Each frame | Rule of thirds |
| | Triangular composition |
| | Diagonal composition |
| | Central one-point composition |
| | Symmetry composition |
| Inter frame | Horizontal moving time |
| | Vertical moving time |
| | Zoom-out time |
| | Zoom-in time |

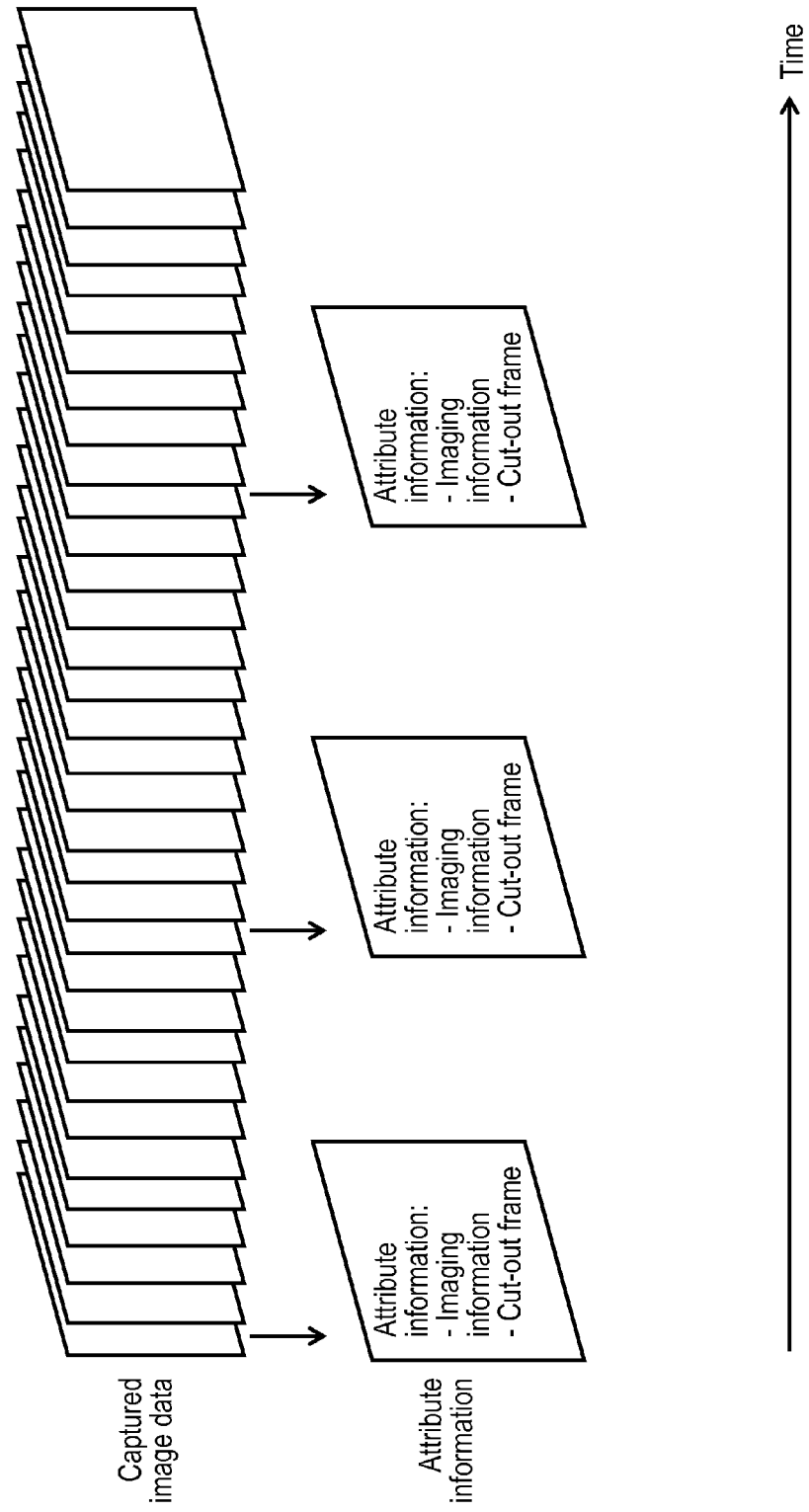

IMAGE GENERATION DEVICE, IMAGING DEVICE, IMAGE GENERATION METHOD, AND PROGRAM FOR GENERATING A NEW IMAGE FROM A CAPTURED IMAGE BASED ON A CUT-OUT FRAME

TECHNICAL FIELD

The present disclosure relates to an image generating device that cuts out a part of an image captured by a video camera or the like to generate a new image, an imaging device equipped with the image generating device, a method of cutting out a part of an image from a captured image to generate a new image, and a program for performing the method.

BACKGROUND ART

PTL 1 discloses an imaging device that can obtain a moving image of a target object without requiring a user to concentrate on the imaging operation during capturing a moving picture. PTL 1 discloses also a configuration that detects a specific object from a captured image, extracts a partial area containing the specific object as a clipped image, and improves resolution of the clipped image.

CITATION LIST

Patent Literature

PTL 1: Unexamined Japanese Patent Publication No. 2009-147727

SUMMARY OF THE INVENTION

Each of an image generating device in accordance with the present disclosure and an imaging device in accordance with the present disclosure comprises: a camerawork information extracting unit that extracts imaging information of a captured image; a composition information calculating unit that temporarily decides a cut-out frame for cutting out a new image from the imaging information and the captured image based on a constraint condition, and decides a cut-out frame to smooth a change of the new image between frames, from the temporarily decided cut-out frame, each of the frames being a unit of an image; and a composition information shaping unit that cuts out the new image from the captured image by using the cut-out frame decided by the composition information calculating unit, and converts a size of the new image to a predetermined size.

The image generating device in accordance with the present disclosure and the imaging device in accordance with the present disclosure make it possible to generate, from the captured image, a new image which is a favorable image that is easy to see for a viewer, and particularly a more smooth and natural image, without any skilled imaging techniques during capturing.

BRIEF DESCRIPTION OF DRAWINGS

FIG. 8 is a diagram explaining an example of a set of constraint conditions in accordance with the first exemplary embodiment.

FIG. 18 is a diagram explaining an example of recording a captured image and attribute information of a newly generated image in accordance with the third exemplary embodiment.

DESCRIPTION OF EMBODIMENTS

Hereinafter, exemplary embodiments will be described in detail with reference to the accompanying drawings as appropriate. However, unnecessarily detailed description may occasionally be omitted. For example, detailed description of well-known matters and redundant description of substantially the same configurations may occasionally be omitted. The omission of these items is to avoid the following description from becoming unnecessarily redundant, and to ease understanding of those skilled in the art.

It should be noted that the following description and the accompanying drawings are provided to allow any person skilled in the art to fully understand the present disclosure, and that it is not intended to limit the subject matter described in the claims by the following description.

First Exemplary Embodiment

If a moving image is generated by extracting regions containing a specific object from a captured image, generating images from images in the extracted region, and connecting the generated images, as disclosed by PTL 1, the generated moving image sometimes becomes an image which is not easy to see for a viewer.

For example, if only a region containing a specific object is extracted from a moving image which was captured by considering the composition or the like during capturing, the composition is sometimes disordered, so that the generated moving image is not easy to see for a viewer. Further, the generated moving image sometimes contains wild motions or strong blinking.

An object of the present disclosure, which is made in consideration of the above-described points, is to provide an image generating device that can cut out a part of a captured image and generate a new image which is easy to see for a viewer, an imaging device equipped with the image generating device, and a method of and a program for cutting out a part of a captured image and generating a new image.

1. Configuration of Video Camera

Figure 1:
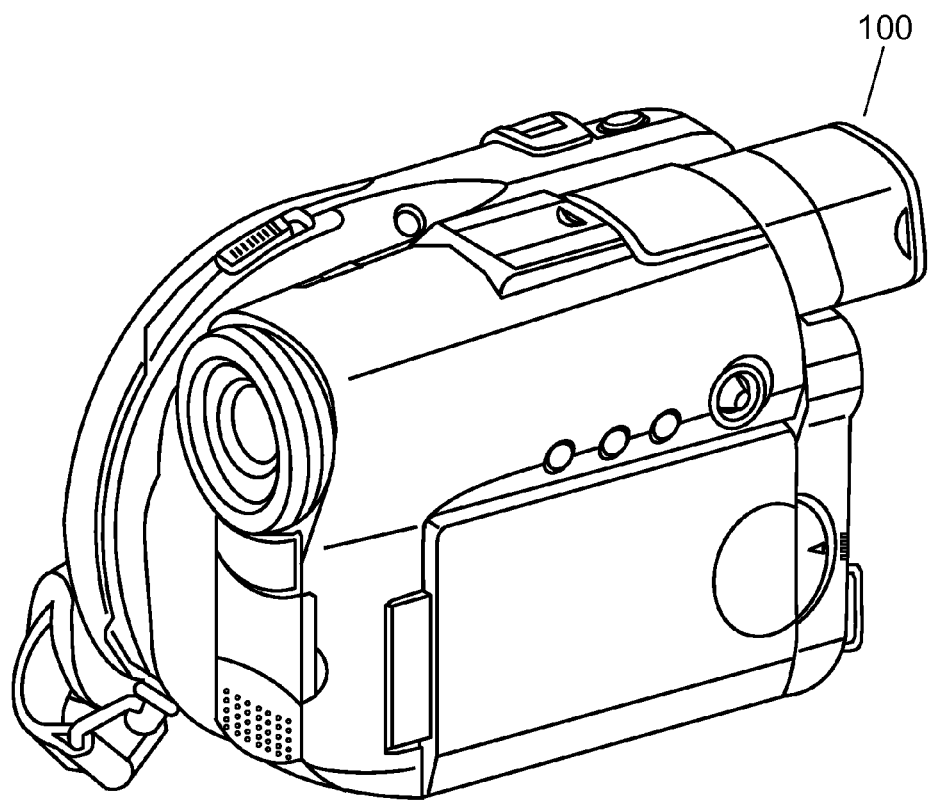
FIG. 1 is a perspective view of a video camera in accordance with a first exemplary embodiment.

FIG. 1 is a perspective view of video camera 100 as an example of imaging device. Video camera 100 captures an image, and records and reproduces the captured image. Video camera 100 generates a new image from the captured image.

Figure 2:
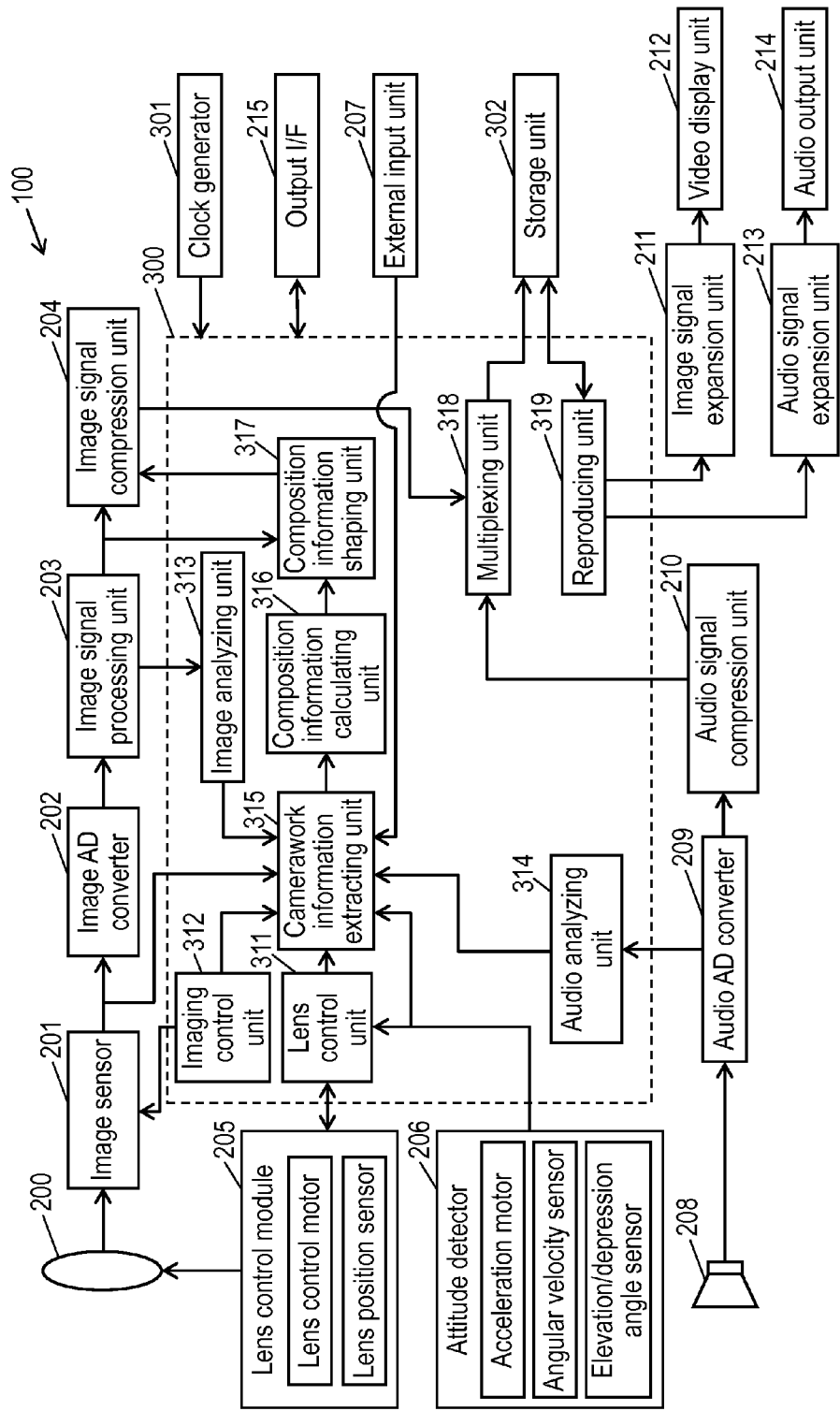
FIG. 2 is a block diagram showing an outline configuration of the video camera in accordance with the first exemplary embodiment.

FIG. 2 is a block diagram showing an outline configuration of video camera 100.

Video camera 100 has lens group 200, image sensor 201, image AD converter (image analog digital converter) 202, image signal processing unit 203, image signal compression unit 204, lens control module 205, attitude detector 206, external input unit 207, microphone 208, audio AD converter (audio analog digital converter) 209, audio signal compression unit 210, image signal expansion unit 211, video display unit 212, audio signal expansion unit 213, audio output unit 214, output I/F (output interface) 215, control unit 300, clock generator 301, and storage unit 302. Video camera 100 configures an image generating device and an imaging device.

Lens group 200 includes a plurality of lenses and focuses incident light from an object to form an image on image sensor 201. Lens group 200 is configured so that the distances between the plurality of lenses can be adjusted to change the focal length and the zoom magnification. The focal length and the zoom magnification may be adjusted manually by a user or may be adjusted by control unit 300.

Image sensor 201 converts incident light to an electric signal. Image sensor 201 is configured by a CCD (charge coupled device) or a CMOS (complementary metal oxide semiconductor). Image sensor 201 outputs an electric signal in an arbitrary area on an imaging plane. Image sensor 201 can output, in addition to information regarding the image, other information including: chromaticity space information of the three primary color points; coordinates of white color; gain information, color temperature information and Δuv (delta uv) of at least two of the three primary colors; and gamma information of the three primary colors or the luminance signal. Accordingly, an output from image sensor 201 is input not only to image AD converter 202, but also to later-described camerawork information extracting unit 315 of control unit 300.

Image AD converter 202 converts an analog electric signal output from image sensor 201 to a digital signal.

Image signal processing unit 203 amplifies the digital signal output from image AD converter 202, and performs specific processes such as white balance and color correction. Image signal processing unit 203 is configured, for example, by an IC (integrated circuit) for image signal conversion. An output from image signal processing unit 203 is input not only to image signal compression unit 204, but also to later-described image analyzing unit 313 of control unit 300.

Image signal compression unit 204 performs a specific encoding process of a digital video signal output from image signal processing unit 203 to compress data amount. The specific encoding process includes an encoding scheme such as MPEG-2, MPEG-4, or H264/MPEG-4 AVC (Advanced Video Coding). An output from image signal compression unit 204 is input to control unit 300. Image signal compression unit 204 is configured, for example, an IC for image signal compression and expansion. The digital video signal output from image signal processing unit 203 and a signal output from later-described composition information shaping unit 317 of control unit 300 input to image signal compression unit 204. Such an input signal is encoded with the specific scheme and compressed data amount.

Lens control module 205 detects a condition of lens group 200, and operates lens group 200. Lens control module 205 has lens control motors, and a lens position sensor. The lens position sensor detects a distance between a plurality of lenses configuring lens group 200 or a positional relation between the plurality of lenses. The lens position sensor outputs its detection signal to control unit 300. Lens control module 205 has two kinds of lens control motors. One of the lens control motors moves lens group 200 in an optical axis direction based on a control signal from control unit 300. This motion changes the distance between the plurality of lenses of lens group 200 to adjust the focal length and the zoom magnification of lens group 200. The other of the lens control motor moves at least one lens of lens group 200 such as an image blur correction lens, in a plane perpendicular to the optical axis, based on a control signal from control unit 300. This motion corrects an image blur.

Attitude detector 206 detects an attitude of the body of video camera 100. Attitude detector 206 has an acceleration sensor, an angular velocity sensor, and an elevation/depression angle sensor. These sensors make it possible to recognize the attitude of video camera 100 during capturing. To precisely detect the attitude of video camera 100, it is preferable that each of the acceleration sensor and the angular velocity sensor can detect an attitude of video camera 100 in orthogonal three axes directions, i.e., vertical direction of the video camera 100, longitudinal direction of the video camera 100 and lateral direction of the video camera 100.

Incidentally, attitude detector 206 may not necessarily have the above-described configuration, and may be configured by any one of the above-mentioned sensors or by other sensors than the above-mentioned sensors.

External input unit 207 inputs external information to video camera 100. A signal from external input unit 207 is input to control unit 300. Although the signal from external input unit 207 is input to only camerawork information extracting unit 315 in FIG. 2, it is also input to other parts for input operations of lens control unit 311 and the like. During capturing, various pieces of external information are input to video camera 100 through external input unit 207. For example, external input unit 207 includes an input button, which is one of input interfaces receiving information input by the user, and a tripod sensor for detecting whether or not video camera 100 is set up on a tripod. The user can inform video camera 100 of various requests from the user such as start or end of capturing, reproduction of a captured image, recording of a captured image in storage unit 302, and cutting out of a part of a captured image to generate a new image, by operating the input button. The tripod sensor is configured by a switch provided on video camera 100 at a part to which the tripod is fixed. It is possible by the tripod sensor to determine whether or not an imaging is performed by using a tripod.

Incidentally, the components for configuring external input unit 207 is not be limited to the input button and the tripod sensor, and may include any device that can receive an instruction from the user, such as a touch panel or a joystick.

Microphone 208 collects ambient sounds around video camera 100, converts the collected sounds to an electric signal, and outputs this signal as an analog audio signal, while the video camera captures an image.

Audio AD converter 209 converts the analog audio signal output from microphone 208 to an audio data which is a digital audio signal.

Audio signal compression unit 210 encodes the digital audio signal output from audio AD converter 209 by a predetermined encoding method. The predetermined encoding method includes, for example, MP3 (MPEG Audio Layer-3), and AAC (Advanced Audio Coding). Audio signal compression unit 210 is configured, for example, by an IC for audio signal compression.

Image signal expansion unit 211 decodes a video signal output from control unit 300. An output from image signal expansion unit 211 is input to video display unit 212.

Video display unit 212 displays an image recorded in video camera 100, an image being captured in real time by video camera 100, an image captured in the past, or an image which is newly generated from images obtained by cutting out a part of a captured image, which will be described later. Other than these, video display unit 212 displays various pieces of information including, for example, imaging information and device information. Video display unit 212 is configured, for example, by a touch panel type liquid crystal display. Touch panel type video display unit 212 also functions as external input unit 207. Image signal expansion unit 211 is configured, for example, by an IC for image signal expansion.

Audio signal expansion unit 213 decodes an audio signal output from control unit 300. Audio signal expansion unit 213 is configured, for example, by an IC for audio signal expansion.

An output from audio signal expansion unit 213 is input to audio output unit 214. Audio output unit 214 outputs a sound associated with an image. In addition, audio output unit 214 outputs a warning sound of which video camera 100 informs the user. Audio output unit 214 is configured, for example, by a speaker.

Output I/F 215 is an interface for externally outputting a video signal from video camera 100. Specifically, output I/F 215 includes, for example, a cable interface for connecting video camera 100 and an external device with a cable, and a memory card interface for recording a video signal in a memory card.

Control unit 300 controls the entire video camera 100. Control unit 300 is configured so as to be capable of sending a signal to and receiving a signal from, for example, image sensor 201, image signal processing unit 203, image signal compression unit 204, lens control module 205, attitude detector 206, external input unit 207, audio AD converter 209, audio signal compression unit 210, image signal expansion unit 211, audio signal expansion unit 213, output I/F 215, and storage unit 302. In the present exemplary embodiment, control unit 300 is configured by a CPU (central processing unit). Control unit 300 performs various controls of video camera 100 by loading programs stored in storage unit 302 and executing the programs. Exemplary examples of controls performed by control unit 300 include focal length control and zoom control of lens group 200, processing of input signals from attitude detector 206 and external input unit 207, and operation control of ICs including, for example, image signal processing unit 203, image signal compression unit 204, audio signal compression unit 210, image signal expansion unit 211 and audio signal expansion unit 213. Although not shown in the figure, signals are occasionally subjected to AD conversion or DA conversion between control unit 300 and lens control module 205. Incidentally, control unit 300 may be configured by an integrated circuit such as the one called IC.

Clock generator 301 supplies a clock signal, which is a reference signal for processing operation in video camera 100, to control unit 300 and the like. Incidentally, clock generator 301 may supply either a single clock or a plurality of clocks depending on the integrated circuit to be used or data to be processed. Also, a clock signal generated by a single oscillator may be multiplied by an arbitrary number to generate multiple clock signals.

Storage unit 302 includes a ROM (read only memory), a RAM (random access memory), and a HDD (hard disk drive). The ROM stores programs processed by control unit 300 and various data required for the programs to operate. The RAM is used as a memory area that is used when a program processed by control unit 300 is being executed. The RAM may also be used as a memory area of an IC. The HDD stores various data including, for example, video data encoded by image signal compression unit 204, audio data encoded by audio signal compression unit 210, and later-described image data generated from images obtained by cutting out a part of a captured image. The HDD also stores some programs to be executed by control unit 300. Storage unit 302 is not be limited to the HDD, and may be a semiconductor memory, or may include a removable medium such as an SD memory card, a CD-ROM and a DVD.

Next, control unit 300 will be described in detail. Here, such a configuration in control unit 300 will be described that is necessary to cutting out a part of image from a captured image and to generate a new image from the cutout image. Control unit 300 also has such a configuration that allows the video camera to perform the same functions as those of the ordinary video cameras, such as the functions of recording and reproducing the captured image.

Control unit 300 has lens control unit, 311 that controls lens control module 205, imaging control unit 312 that controls image sensor 201, image analyzing unit 313 that analyzes an output from image signal processing unit 203, audio analyzing unit 314 that analyzes an output from audio AD converter 209, camerawork information extracting unit 315 that generates information indicating an imaging condition of video camera 100, composition information calculating unit 316 that analyzes an image captured by video camera 100 and decides a cut-out frame for a newly generated image, composition information shaping unit 317 that generates a new image using the decided cut-out frame, multiplexing unit 318 that multiplexes a video signal and an audio signal, and reproducing unit 319 that performs reproduction. Control unit 300 loads programs stored in storage unit 302, and executes the loaded programs to realize the later-described various processes.

A detection signal of the lens position sensor of lens control module 205 and detection signals of various sensors of attitude detector 206 are inputted to lens control unit 311. Based on these detection signals and information from other components such as image sensor 201, lens control unit 311 outputs, to the lens control motors, control signals for appropriately arranging lens group 200. In this manner, lens control unit 311 performs controls such as zoom control, focus control, and image blur correction control. Further, lens control unit 311 also outputs the control signals for controlling lens group 200 to camerawork information extracting unit 315. Furthermore, the detection signals of the various sensors of attitude detector 206 are also output to camerawork information extracting unit 315.

Imaging control unit 312 controls an operation of image sensor 201. Imaging control unit 312 controls the exposure, the imaging speed, and the sensitivity of image sensor 201 during capturing. A control signal output from imaging control unit 312 is input to not only image sensor 201, but also camerawork information extracting unit 315.

Image analyzing unit 313 extracts features of an image based on video data from image signal processing unit 203. Image analyzing unit 313 detects color information of the image, such as information of color distribution contained in the image and white balance information. Detection of the color distribution can be realized by checking color information contained in data forming a digital video signal. Also, when a human face is contained in an image, image analyzing unit 313 detects the face from the image. The face detection can be realized by using, for example, a pattern matching technique.

Audio analyzing unit 314 analyzes audio data from audio AD converter 209 and extracts a distinctive sound. Here, the distinctive sound includes, for example, the voice of photographer, pronunciation of a particular word, a cheer, and a sound of gunshot. These sound can be extracted by, for example, such a method of preliminarily registering peculiar frequencies contained in the respective sounds and comparing frequencies of each extracted sound with the registered frequencies. As another method, a sound providing an input sound level higher than a specified level may be determined as a distinctive sound.

Camerawork information extracting unit 315 extracts imaging information regarding an image that is captured. Output signals from image sensor 201, attitude detector 206, external input unit 207, lens control unit 311, imaging control unit 312, image analyzing unit 313 and audio analyzing unit 314 are inputted to camerawork information extracting unit 315. Camerawork information extracting unit 315 extracts imaging information based on these output signals.

The imaging information regarding an image includes information regarding a condition of the imaging device and a camerawork during capturing the image, information regarding an object and a background contained in the image, information regarding a sound associated with the image. The information regarding the imaging device during capturing includes, for example, focal length, zoom magnification, exposure, imaging speed, sensitivity, color space information of the three primary colors, white balance, gain information of at least two of the three primary colors, color temperature information, $\Delta uv$ (delta uv), gamma information of the three primary colors or the luminance signal, color distribution, face recognition information, camera attitude including acceleration, angular velocity and elevation/depression angle, imaging time such as imaging start time and imaging end time, imaging index information, user input contents, frame rate, and sampling frequency. For example, camerawork information extracting unit 315 extracts a focal length and a zoom magnification as the imaging information, based on a control signal from lens control unit 311.

Also, camerawork information extracting unit 315 detects a camera attitude including an acceleration, an angular velocity and an elevation/depression angle based on a detection signal from attitude detector 206. And camerawork information extracting unit 315 extracts, as the imaging information, a camera operation of video camera 100 during capturing such as panning which is an operation of rotating the camera direction in a horizontal plane, and tilting which is an operation of rotating the camera direction in a vertical plane, based on the detected camera attitude. Further, camerawork information extracting unit 315 extracts an image captured by holding video camera 100 as the imaging information, after capturing images with moving video camera 100. In the manner as described above, camerawork information extracting unit 315 may extract the imaging information from input signals themselves, or may extract the imaging information by combining a plurality of the input signals or analyzing the input signals.

Composition information calculating unit 316 decides a cut-out frame for a newly generating image based on the imaging information extracted by camerawork information extracting unit 315. Details of the decision of the cut-out frame will be described later.

Composition information shaping unit 317 generates a new image from a captured image output from image signal processing unit 203 based on the cut-out frame decided by composition information calculating unit 316. Composition information shaping unit 317 outputs the generated new image to image signal compression unit 204. Details of the generation of the new image will be described later.

Multiplexing unit 318 multiplexes an encoded video data from image signal compression unit 204 and an encoded audio data from audio signal compression unit 210, and outputs the multiplexed data. The data multiplexed by multiplexing unit 318 is stored in storage unit 302. The multiplexing method may, for example, be MPEG TS (MPEG Transport Stream), but is not be limited to this method.

Incidentally, an example of multiplexing the encoded video data and the encoded audio data is described in the present exemplary embodiment. However, the encoded video data and the encoded audio data may not necessarily be multiplexed.

These processes by camerawork information extracting unit 315, composition information calculating unit 316, composition information shaping unit 317 and multiplexing unit 318 are performed sequentially during capturing or immediately after capturing.

Reproducing unit 319 performs reproduction of a cut-out image based on a user input after completion of capturing. In detail, reproducing unit 319 reads out the multiplexed data stored in storage unit 302, and outputs parts of encoded video data and encoded audio data that should be reproduced to image signal expansion unit 211 and audio signal expansion unit 213, respectively. The output encoded video data and encoded audio data are respectively decoded by image signal expansion unit 211 and audio signal expansion unit 213, and output from video display unit 212 and audio output unit 214. In this manner, a cut-out image from a captured image among the stored images is reproduced.

2. Generation of New Image

Next, a procedure of cutting out a part of image from a captured image and generating a new image will be described by using an example of captured image. The process of cutting out a part of image from a captured image and generating a new image is performed by camerawork information extracting unit 315, composition information calculating unit 316, and composition information shaping unit 317.

Figure 3:
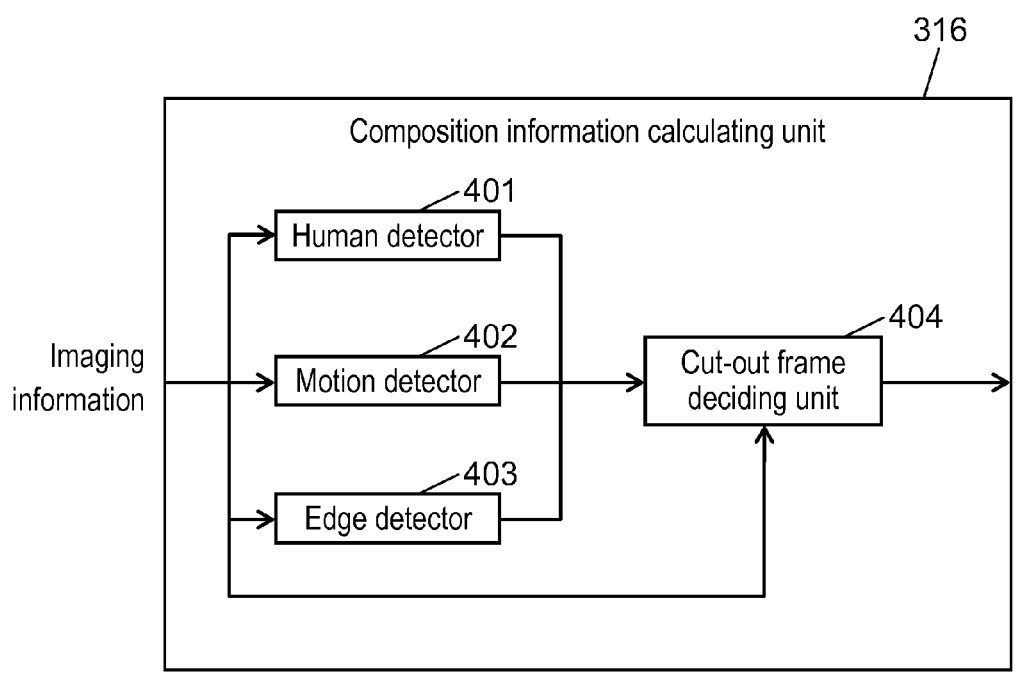
FIG. 3 is a block diagram showing details of a composition information calculating unit shown in FIG. 2.

FIG. 3 is a diagram showing a detailed configuration of composition information calculating unit 316. An input signal to composition information calculating unit 316 is the imaging information output from camerawork information extracting unit 315. Composition information calculating unit 316 is configured by human detector 401, motion detector 402, edge detector 403, and cut-out frame deciding unit 404. Human detector 401 detects whether or not a human is contained in the captured image from the input imaging information, and, if contained, detects, for example, which direction the human faces, and who is the human. Motion detector 402 detects whether or not a human or another object is moving between frames from the input imaging information. Each of frames is a unit of an image. Edge detector 403 detects whether a distinctive figure is moving from one frame to a next frame, or in other words, whether the imaging is performed under the condition that video camera 100 is fixed. Cut-out frame deciding unit 404 decides a cut-out frame based on the imaging information and detection results of human detector 401, motion detector 402 and edge detector 403.

Figure 4:
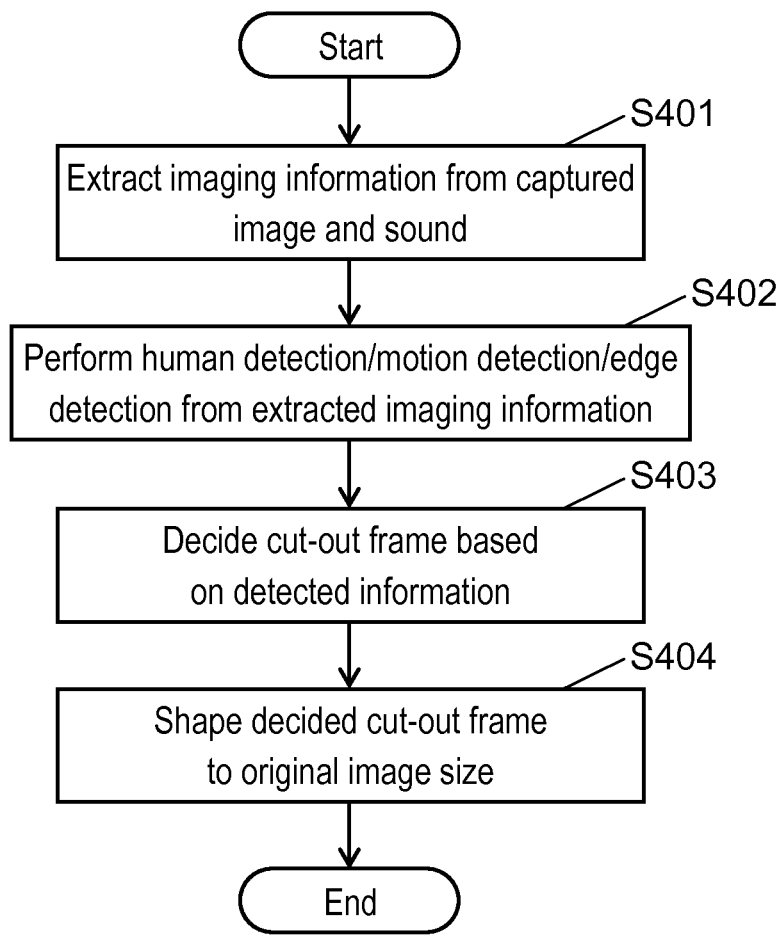
FIG. 4 is a flowchart explaining a procedure to cut out a part of image from a captured image and generate a new image in accordance with the first exemplary embodiment.

FIG. 4 is a flowchart explaining a procedure to cut out a part of image from a captured image and to generate a new image.

Figure 5:
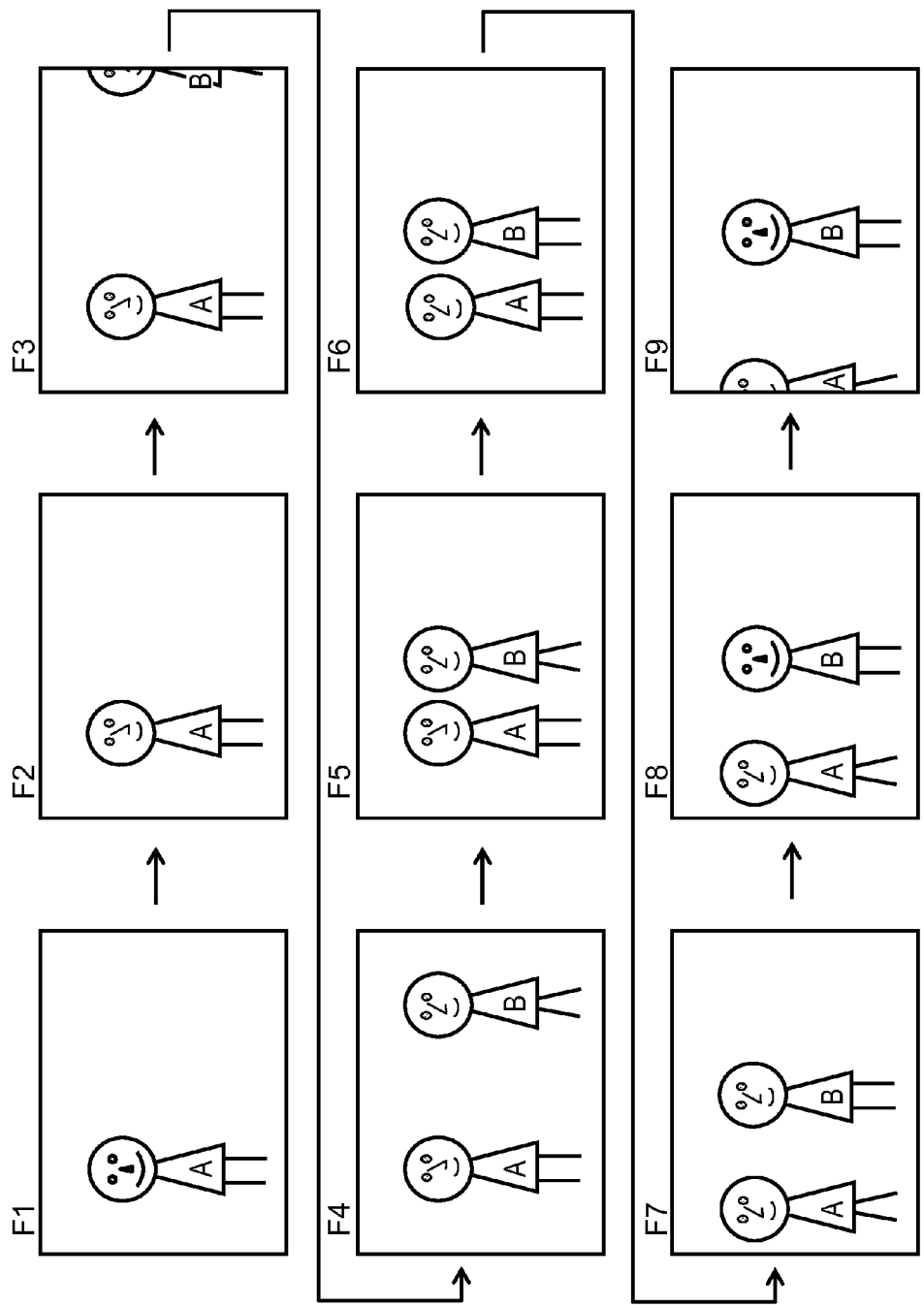
FIG. 5 is a diagram showing an example of image captured by video camera 100.

FIG. 5 is a diagram showing an example of image captured by video camera 100. Referring to FIG. 5, a captured image is shown by frames. Each of frames is a unit of an image. The image in this example is captured in the order of frame F1, frame F2, frame F3, frame F4, frame F5, frame F6, frame F7, frame F8, and frame F9. The image is captured by video camera 100 fixed to a tripod. In frame F1, person A facing the front is standing at a position on the slightly left side of the frame. In frame F2, compared to frame F1, person A is at the same standing position as that in frame F1, and turns right viewing from a position of video camera 100 under image-capturing operation. In frame F3, compared to frame F2, person B is visible at the right end of the frame. In frame F4, compared to frame F3, person B walks from the right end toward the left side of the frame. In frame F5, compared to frame F4, person B walks to the person A's immediate right. In frame F6, compared to frame F5, person B is standing on the person A's immediate right and person A turns left. In frame F7, compared to frame F6, person A turns left, and walks toward the left end. In frame F8, compared to frame F7, person B faces the front. In frame F9, compared to frame F8, person A is disappearing to the left end of the frame. By using the example of captured image as shown in FIG. 5, a procedure of generating a new image will be described below.

(Step S401) Camerawork information extracting unit 315 extracts imaging information regarding an image being captured. Output signals from image sensor 201, attitude detector 206, external input unit 207, lens control unit 311, imaging control unit 312, image analyzing unit 313 and audio analyzing unit 314 are inputted to camerawork information extracting unit 315. Camerawork information extracting unit 315 extracts the imaging information based on these output signals.

The imaging information regarding an image includes information regarding a condition of the imaging device and a camerawork during capturing the image, information regarding an object and a background contained in the image, and information regarding a sound associated with the image. The information regarding the imaging device during capturing includes, for example, focal length, zoom magnification, exposure, imaging speed, sensitivity, color space information of the three primary colors, white balance, gain information of at least two of the three primary colors, color temperature information, Δuv (delta uv), gamma information of the three primary colors or the luminance signal, color distribution, face recognition information, camera attitude including acceleration, angular velocity and elevation/depression angle, imaging time including imaging start time and imaging end time, imaging index information, user input contents, frame rate, and sampling frequency. For example, camerawork information extracting unit 315 extracts a focal length and a zoom magnification as the imaging information, based on a control signal from lens control unit 311. Also, camerawork information extracting unit 315 detects a camera attitude including an acceleration, an angular velocity and an elevation/depression angle based on a detection signal from attitude detector 206. And camerawork information extracting unit 315 extracts, as the imaging information, a camera operation of video camera 100 during capturing such as panning which is an operation of rotating the camera direction in a horizontal plane, and tilting which is an operation of rotating the camera direction in a vertical plane, based on the detected camera attitude. Further, camerawork information extracting unit 315 extracts an image captured by holding video camera 100 as the imaging information, after capturing images with moving video camera 100. In the manner as described above, camerawork information extracting unit 315 may extract the imaging information from input signals themselves, or may extract the imaging information by combining a plurality of the input signals or analyzing the input signals.

(Step S402) Next, human detection, motion detection and edge detection are performed by using the imaging information extracted by camerawork information extracting unit 315.

Human detector 401 detects a human from the imaging information. The human detection may simply detect whether or not an object is a human, or may preliminarily register a particular person as a person to be recognized in storage unit 302 and compare a detected person with the registered person to identify the detected person. Also, the human detection includes detection of a facing direction, or whether the detected human is facing frontward or backward. Also, human detector 401 may detect a human contained in the image from the view point of perspective of the captured image. For example, in a case where person A and person B are contained in an image and person A is seen larger than person B, it may be detected that person A is at a forward position and person B is at a backward position.

Motion detector 402 identifies a part that is moving between frames, and identifies in what direction and how fast the part is moving from one frame to a next frame. Motion detection can be realized by using the technique such as a motion vector between frames.

Edge detector 403 analyzes the captured image to identify a background. Specifically, in the process of identifying "motion", edge detector 403 recognizes a part which is a small amount of "motion" as a background. This makes it possible to discriminate a background part.

Edge detector 403 may identify a background part based on a contour intensity or the texture of an object in the captured image. Further, edge detector 403 may identify a background part by analyzing information regarding colors of the captured image, such as histograms respectively representing color distribution information of R, G and B. Furthermore, edge detector 403 also detects whether or not a distinctive figure such as a window frame of a building or a road sign in an identified background part is moving, or in other words, whether or not imaging is performed by fixing video camera 100.

Figure 6:
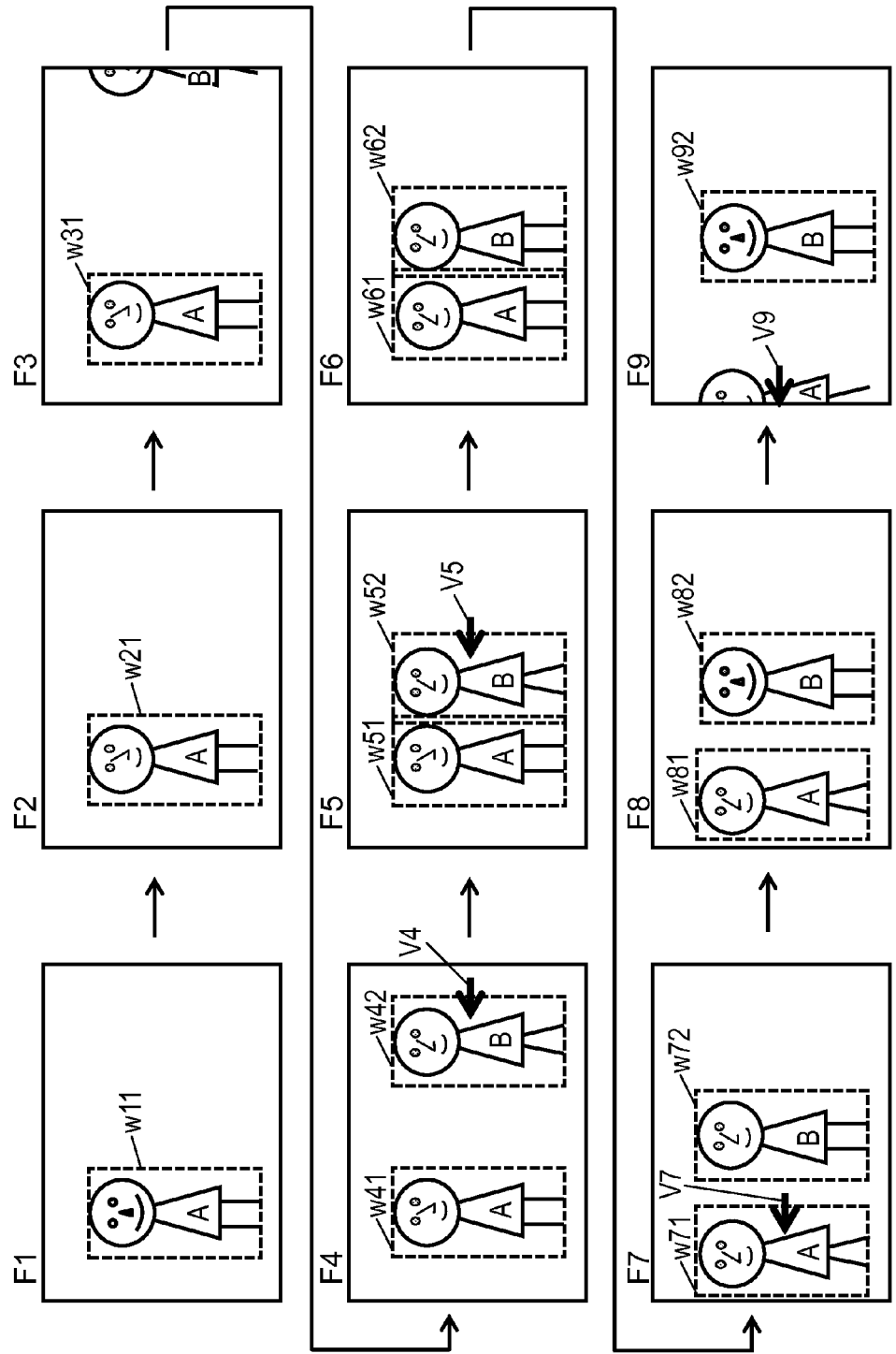
FIG. 6 is a diagram explaining a result of detecting a human and a motion between frames in the example of captured moving image shown in FIG. 5.

FIG. 6 is a diagram explaining a result of the human detection and the motion detection between frames in the example of captured image shown in FIG. 5.

In frame F1, person A is detected as a human by the human detection, and the detection result is indicated by human detection bounding box w11 surrounding person A.

In frame F2, person A is continuously detected as a human, and the detection result is indicated by human detection bounding box w21 surrounding person A.

In frame F3, person A is continuously detected as a human, and the detection result is indicated by human detection bounding box w31 surrounding person A.

In frame F4, person B is detected as a human in addition to detection of person A by the human detection, and the detection result is indicated by human detection bounding box w41 surrounding person A and human detection bounding box w42 surrounding person B. Also, in frame F4, compared to frame F3, it is detected by the motion detection that person B walks leftward, and the detected "motion" is indicated by motion vector V4.

In frame F5, person A and person B are continuously detected by the human detection as humans, and the detection result is indicated by human detection bounding box w51 and human detection bounding box w52 that surround person A and person B, respectively. Also, in frame F5, compared to frame F4, the motion of person B continuously moving leftward is detected by the motion detection, and the detected "motion" is indicated by motion vector V5.

In frame F6, person A and person B are continuously detected by the human detection as humans, and the detection result is indicated by human detection bounding box w61 and human detection bounding box w62 that surround person A and person B, respectively.

In frame F7, person A and person B are continuously detected by the human detection as humans, and the detection result is indicated by human detection bounding box w71 and human detection bounding box w72 that surround person A and person B, respectively. Also, in frame F7, compared to frame F6, it is detected by the motion detection that person A has moved leftward, and the detected "motion" is indicated by motion vector V7.

In frame F8, person A and person B are continuously detected by the human detection as humans, and the detection result is indicated by human detection bounding box w81 and human detection bounding box w82 that surround the respective detected persons.

In frame F9, person A who is disappearing at the left end of the frame is not detected by the human detection. Person B is continuously detected as a human by the human detection, and the detection result is indicated by human detection bounding box w92 surrounding person B. Also, in frame F9, compared to frame F8, the motion of person A moving leftward is detected by the motion detection, and the detected "motion" is indicated by motion vector V9.

Here, in the example of FIG. 6, the human detection is performed by human detector 401, and the motion vector detection is performed by motion detector 402. In the example of FIG. 6, since the imaging information contains information indicating that video camera 100 is fixed, no detection by edge detector 403 is performed.

(Step S403) Cut-out frame deciding unit 404 decides a cut-out frame from the imaging information, a detection result of human detector 401, a detection result of motion detector 402, and a detection result of edge detector 403.

Figure 7:
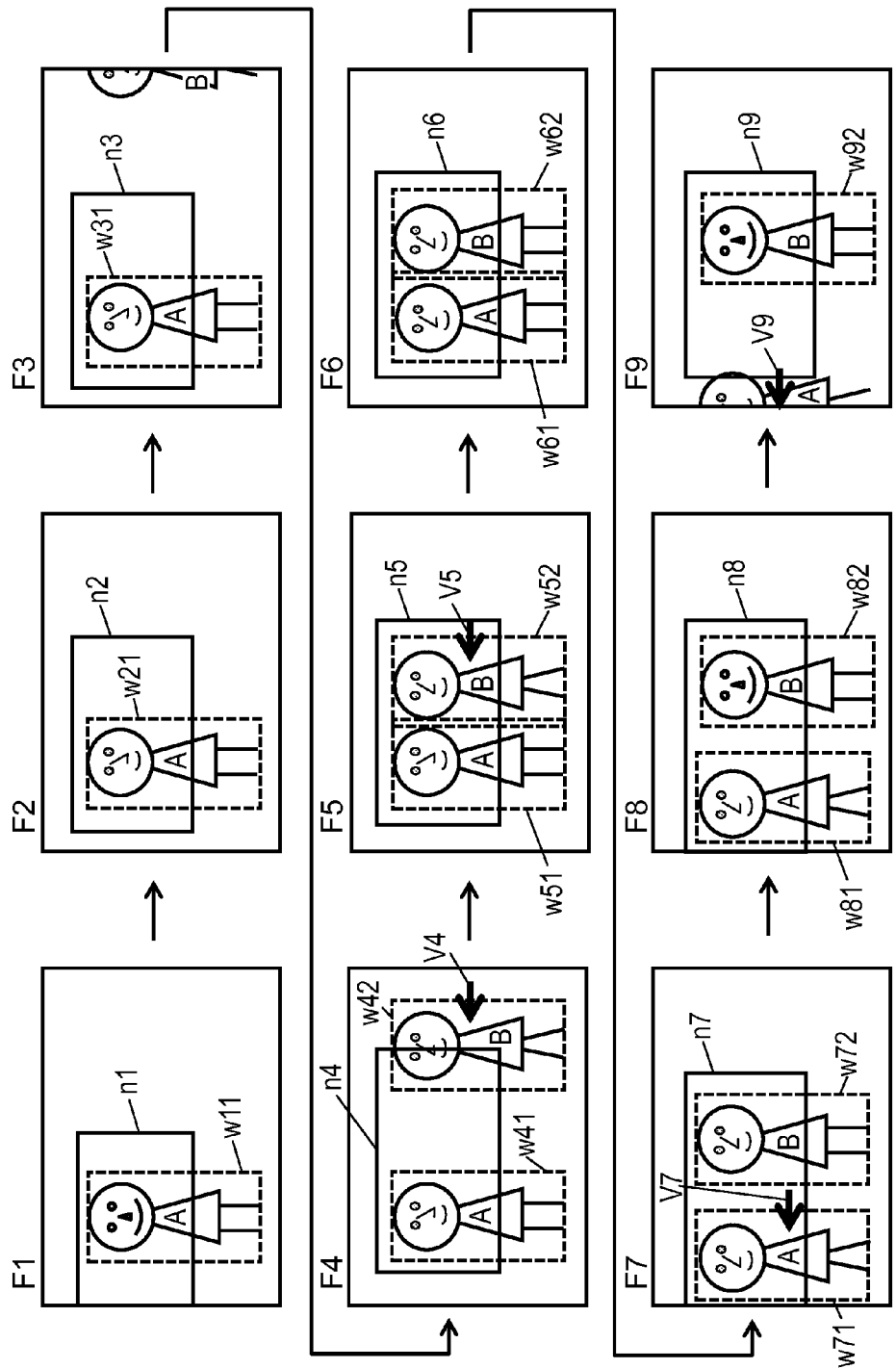
FIG. 7 is a diagram explaining how to decide a cut-out frame from the result of detecting the human and the motion between frames shown in FIG. 6 in the example of captured image shown in FIG. 5.

FIG. 7 is a diagram explaining how to decide a cut-out frame from the result of the human detection and the result of the motion detection between frames shown in FIG. 6 in the example of captured image shown in FIG. 5.

There are some constraint conditions to be satisfied when a part of image is cut out from a captured image. FIG. 8 is a diagram explaining an example of a set of constraint conditions. The constraint conditions include constraints of the cut-out frame itself, constraints in each frame, and interframe constraints.

The constraints of the cut-out frame itself are constraints of the cut-out frame size. For example, the cut-out frame size is restricted to ¼ or larger than the captured image screen. Further, for example, a degree of change in the cut-out frame size between frames is restricted to be within W %, where w is a decimal fraction.

The constraints in each frame relate to frame composition. The constraints regarding frame composition includes the rule of thirds, the triangular composition, the diagonal composition, the central one-point composition, and the symmetry composition. The rule of thirds is a constraint that requires assuming a screen divided into nine equal areas by two vertical lines drawn at constant intervals in the horizontal direction and two horizontal lines drawn at constant intervals in the vertical direction, and locating important elements in the scene along the lines or at the points where the lines intersect. The triangular composition is a constraint that requires locating a tall element such as a tall tree or building at the center of the screen, and forming triangle. The diagonal composition is a constraint that requires arranging objects which extend in a strait line, such as a row of trees, a road or a tree branch, along a diagonal line. The central one-point composition is a constraint that requires locating an object at the center of a screen like the national flag of Japan. The symmetry composition is a constraint that requires arranging an object to be horizontally or vertically symmetrical. A composition is decided so as to meet one of the constraints regarding composition.

The interframe constraints are constraints regarding the camerawork between frames. The constraints regarding the camerawork between frames include, for example, a horizontal moving time of the video camera under image-capturing operation, e.g., between S1 seconds and S2 seconds (inclusive), a vertical moving time of the imaging video camera, e.g., between S3 seconds and S4 seconds (inclusive), a zoom-out time, e.g., between S5 seconds and S6 seconds (inclusive), a zoom-in time, e.g., between S7 seconds and S8 seconds (inclusive), where S1, S2, S3, S4, S5, S6, S7 and S8 are decimal fractions. The constraint conditions are stored in storage unit 302. A composition is decided so as to satisfy all of the constraints regarding the camerawork between frames.

A cut-out frame is decided to satisfy the above-described constraint conditions. If a composition cannot be decided so as to satisfy all of the constraints of the cut-out frame itself, the constraints in each frame, and the interframe constraints, priority is set to each constraint, and a composition is decided so as to satisfy as many constraint conditions as possible. For example, priorities may be set in the order of the constraints of the cut-out frame itself, the constraints in each frame, and the interframe constraints.

First, the captured image is captured by a video camera fixed to a tripod as an imaging condition. Accordingly, a clopping frame is decided on the assumption that images are captured by a fixed video camera.

In frame F1, since a human is detected in only human detection bounding box w1 of person A and no motion vector is detected, a cut-out frame is decided from human detection bounding box w1. The cut-out frame is desired to be ¼ or larger than the size of the captured image screen, and person A in human detection bounding box w1 is facing the front and standing. Considering the constraints of the cut-out frame itself and the constraints regarding the frame composition, cut-out frame n1 is decided to obtain such a composition that only a part above the breast of person A is contained and located at the center to satisfy, for example, the symmetry composition.

In frame F2, since person A in human detection bounding box w21 turns right, cut-out frame n2 is decided to obtain such a composition that only a part above the breast of person A is contained and located on the left part of the cut-out frame to satisfy, for example, the rule of thirds composition, from the constraints of the cut-out frame size, the constraints regarding the degree of change in the cut-out frame size from cut-out frame n1 cut out in frame F1, the constraints of the frame composition, and the constraints regarding the camerawork between frames.

In frame F3, since person A is continuously detected as a human by the human detection and the detection result is indicated by human detection bounding box w31 surrounding person A, cut-out frame n3 is decided to be the same as cut-out frame n2.

In frame F4, a cut-out frame is decided from human detection bounding box w41, human detection bounding box w42, and motion vector V4. To cut out a part above the breast of each of person A and person B, cut-out frame n4 is decided from the constraints of the cut-out frame size, the constraints regarding the degree of change in the cut-out frame size from cut-out frame n4 cut out in frame F2, and the horizontal moving time in the constraints regarding the camerawork between frames. In this case, cut-out frame n2 does not contain the full face of person B, because the cut-out frame is decided by giving higher priority to the constraints regarding the camerawork between frames than the constraints regarding the frame composition.

In frame F5, human detection bounding box w51, human detection bounding box w52 and motion vector V5 are indicated. Cut-out frame n5 is decided from the constraints of the cut-out frame size, the constraints regarding the degree of change in the cut-out frame size from cut-out frame n4 cut out in frame F4, the constraints regarding the frame composition, and the constraints regarding the camerawork between frames.

In frame F6, which contains no parts largely changed from frame F5, cut-out frame n6 is decided to be the same position as cut-out frame n5.

In frame F7, a cut-out frame is decided from human detection bounding box w71, human detection bounding box w72 and motion vector V7. Cut-out frame n7 is decided to contain a part above the breast of each of person A and person B, and to give high priority to the constraints regarding the degree of change in the cut-out frame size from cut-out frame n6 cut out in frame F6, because person A is moving.

In frame F8, which contains no parts largely changed from frame F7, cut-out frame n8 is decided to be the same position as cut-out frame n7.

In frame F9, person A being disappearing at the left end of the screen is not detected by the human detection, but motion vector V9 is detected. Accordingly, cut-out frame n9 is decided around person B so as to satisfy some constraint conditions.

Figure 9:
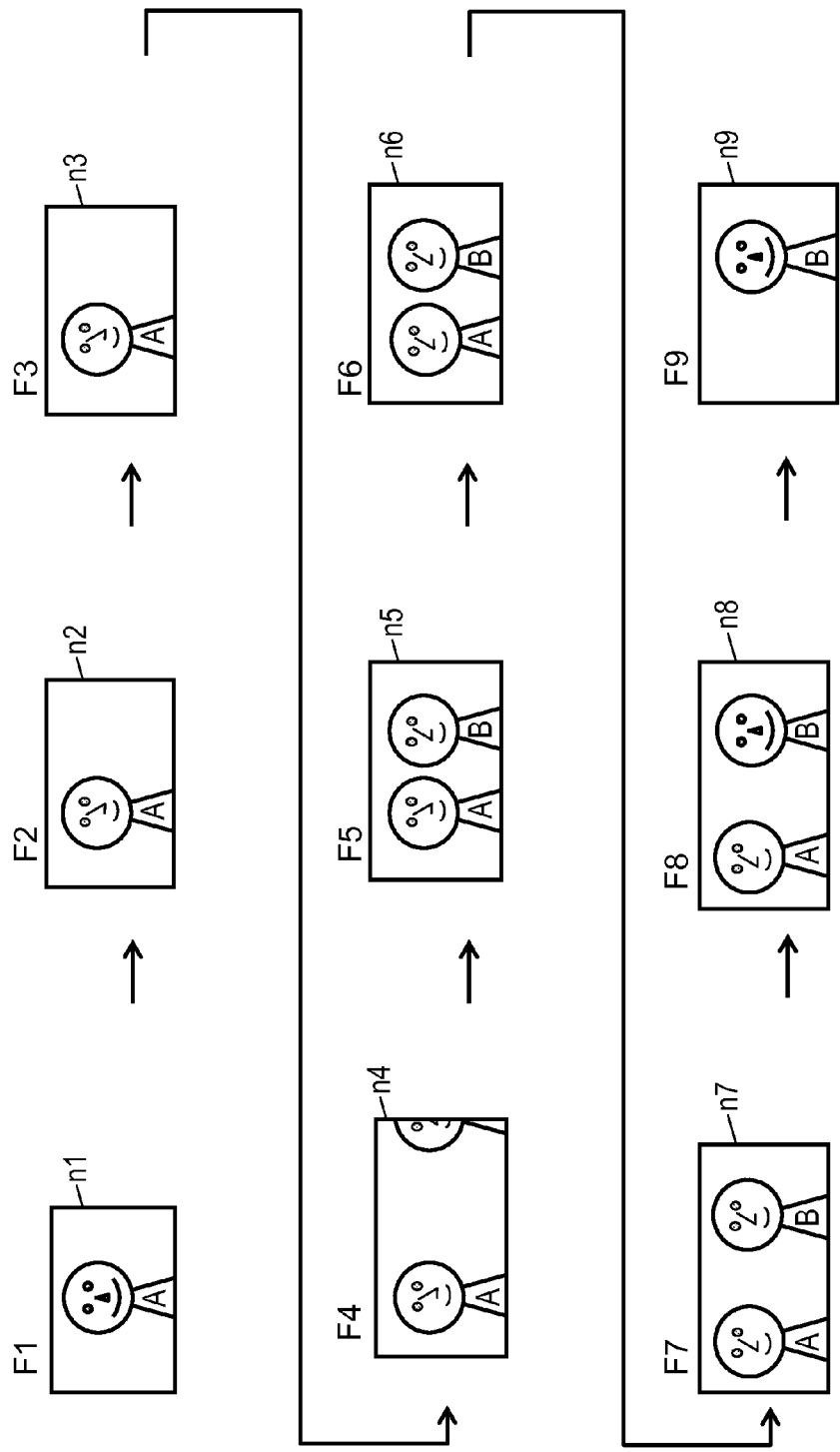
FIG. 9 is a diagram explaining the cut-out frames decided in FIG. 7.

FIG. 9 is a diagram explaining the cut-out frames decided in FIG. 7. Cut-out frame deciding unit 404 decides the cut-out frame in each frame in the manner as described above.

(Step S404) Composition information shaping unit 317 cuts out a part of an output signal of image signal processing unit 203 by a cut-out frame decided by composition information calculating unit 316, enlarges the size of the cut-out image to the same size as that of the captured image to generate a new image. Composition information shaping unit 317 outputs the generated image to image signal compression unit 204.

Figure 10:
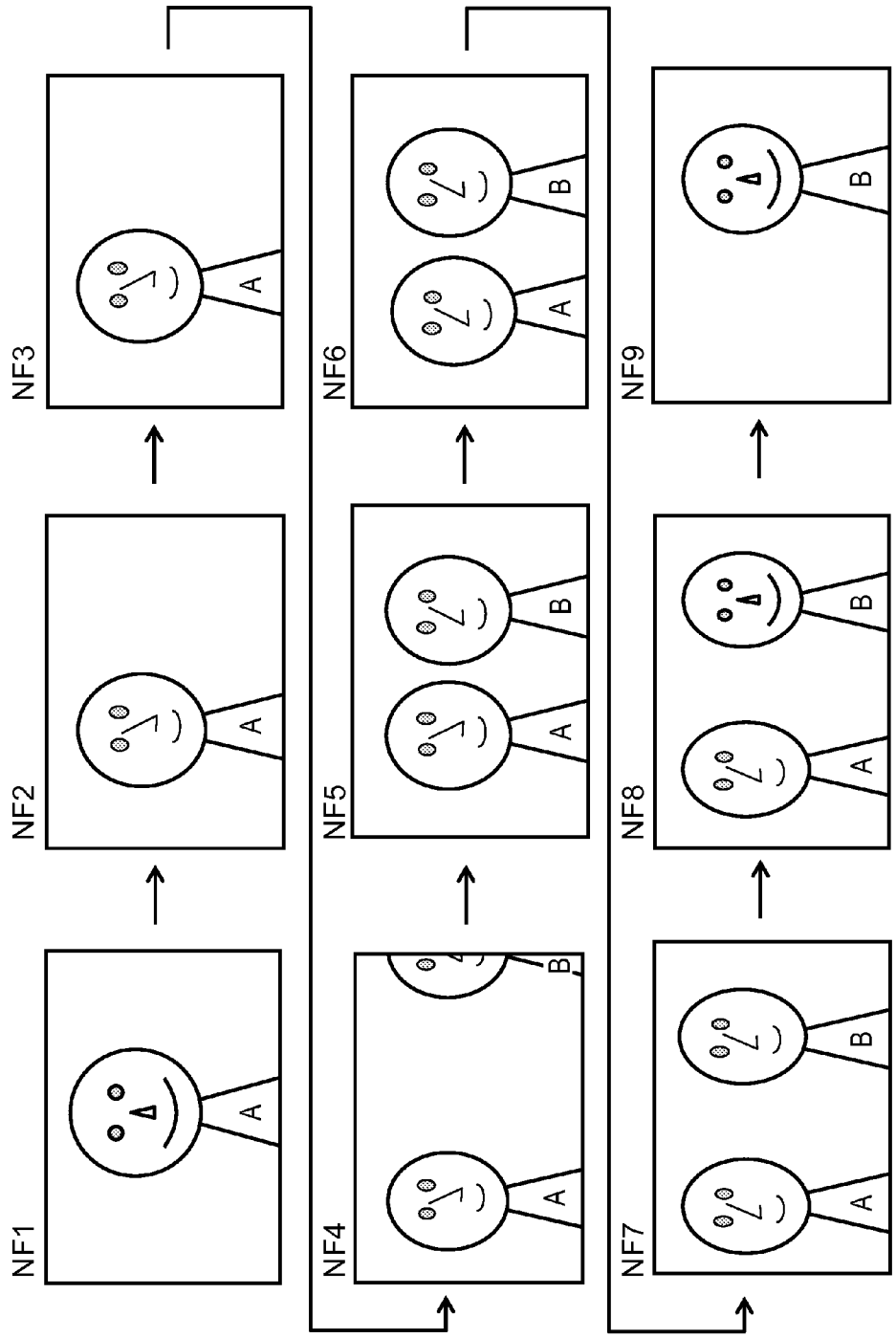
FIG. 10 is a diagram showing an image obtained by enlarging a cut-out frame size of each frame shown in FIG. 9 to a size of the originally captured image.

FIG. 10 is a diagram showing an image obtained by enlarging a cut-out frame size of each frame shown in FIG. 9 to the size of the originally captured image. The generated new image includes frame NF1, frame NF2, frame NF3, frame NF4, frame NF5, frame NF6, frame NF7, frame NF8, and frame NF9.

3. Summary

In the manner as described above, video camera 100 in accordance with the present exemplary embodiment cuts out a part of a captured image, and generates a new image. The new image to be generated is cut out from the captured image under the constraint conditions stored in storage unit 302. Accordingly, the new image generated from the captured image becomes a more preferable image without any skilled imaging techniques during capturing by video camera 100.

It should be noted that the constraint conditions described in the present embodiments are merely examples. The constraint conditions to be used may be at least one of the above-described constraint conditions or may be other constraint conditions. Examples of the other constraint conditions include the S-shaped composition, in which a curved road or a curved river is arranged in an S-shape, or the C-shaped composition, in which a curved road or a curved river is arranged in a C-shape.

Also, the captured image in FIG. 5 contains only humans. In a case of cutting out a part of a captured image which contains a plurality of moving objects including a human and a non-human object such as a car, a cut-out frame may be decided from a gravity center of all detected human and non-human objects. Additionally, the user prioritizes humans and non-human objects as a target for cutting out and a cut-out frame may be decided based on the priorities. Further, the priorities may be specified by external input unit 207.

Incidentally, according to the present exemplary embodiment, the newly generated image is multiplexed together with the captured image by multiplexing unit 318, then stored in storage unit 302, and thereafter reproduced by reproducing unit 319. However, the newly generated image may be reproduced by reproducing unit 319 before being stored in storage unit 302.

Incidentally, in the present exemplary embodiment, the size of the newly generated image is enlarged to the size of the captured image. However, the enlarged size of the newly generated image may not necessarily be the size of the captured image. The size of the newly generated image may be specified by external input unit 207, or may be previously determined.

Second Exemplary Embodiment

According to the first exemplary embodiment, even if a new image is generated from a captured image so as to satisfy the constraint conditions, such a case would sometimes occur that the new image is not smooth between frames. Such case would occur, for example, when the zoom speed of video camera 100 under image-capturing operation is faster than a specified zoom speed or when a human or an object moves faster than a specified speed. In the second exemplary embodiment, the description will be made on an interpolation process that makes a newly generated image to be smooth between frames.

Figure 11:
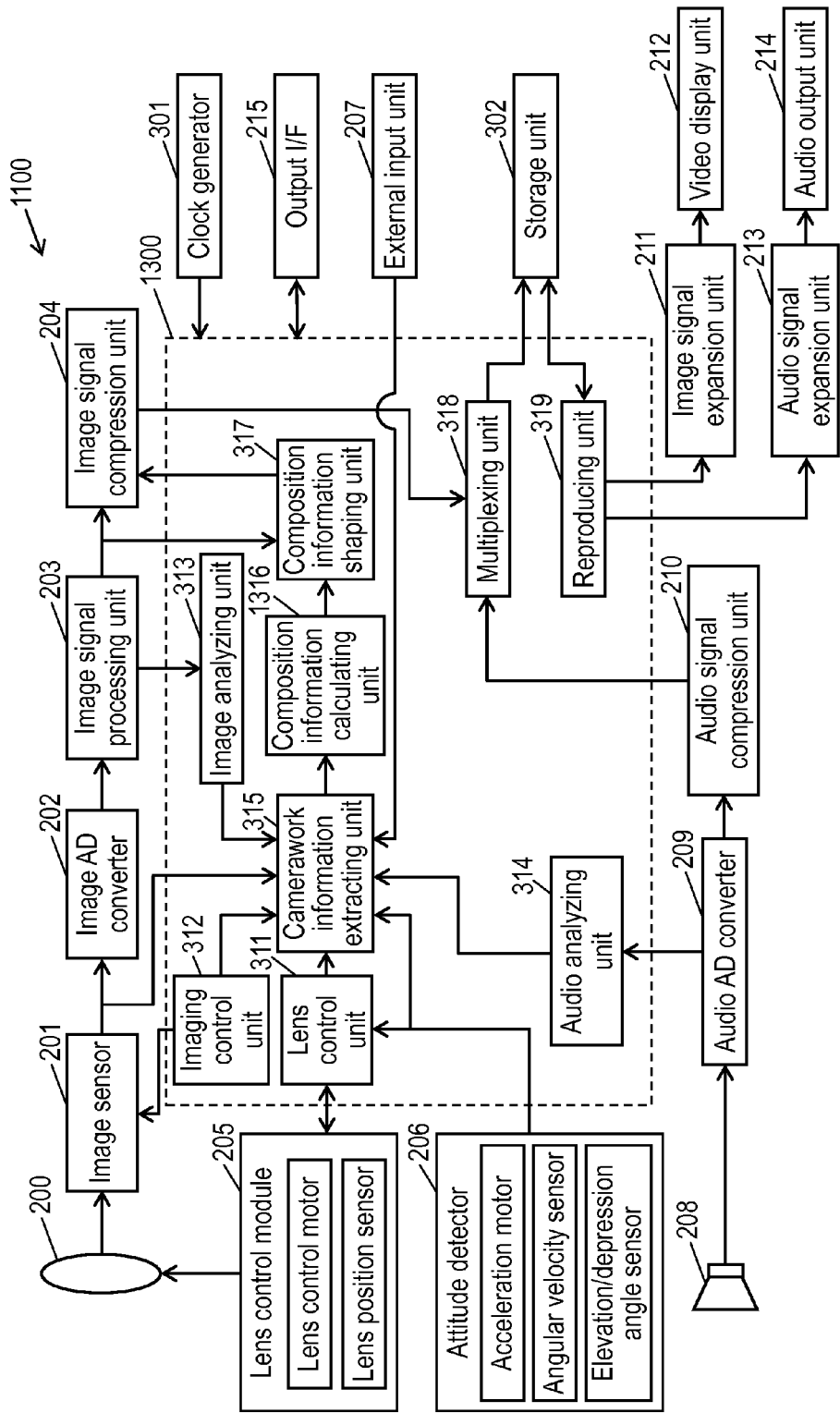
FIG. 11 is a block diagram showing an outline configuration of a video camera in accordance with a second exemplary embodiment.

FIG. 11 is a block diagram showing an outline configuration of video camera 1100 in accordance with the second exemplary embodiment. Video camera 1100 is different from video camera 100 in accordance with the first exemplary embodiment in the manner of deciding the cut-out frame when generating a new image. Specifically, the basic configuration of video camera 1100 is substantially the same as that of video camera 100. Accordingly, the same components as those of the first exemplary embodiment are indicated by the same reference marks, and the description of them will be omitted. A description will be made mainly on the parts different from the first exemplary embodiment.

Video camera 1100 is different from video camera 100 of the first exemplary embodiment in the configuration of control unit 1300. Control unit 1300 is different from control unit 300 of the first exemplary embodiment in the configuration of composition information calculating unit 1316.

Figure 12:
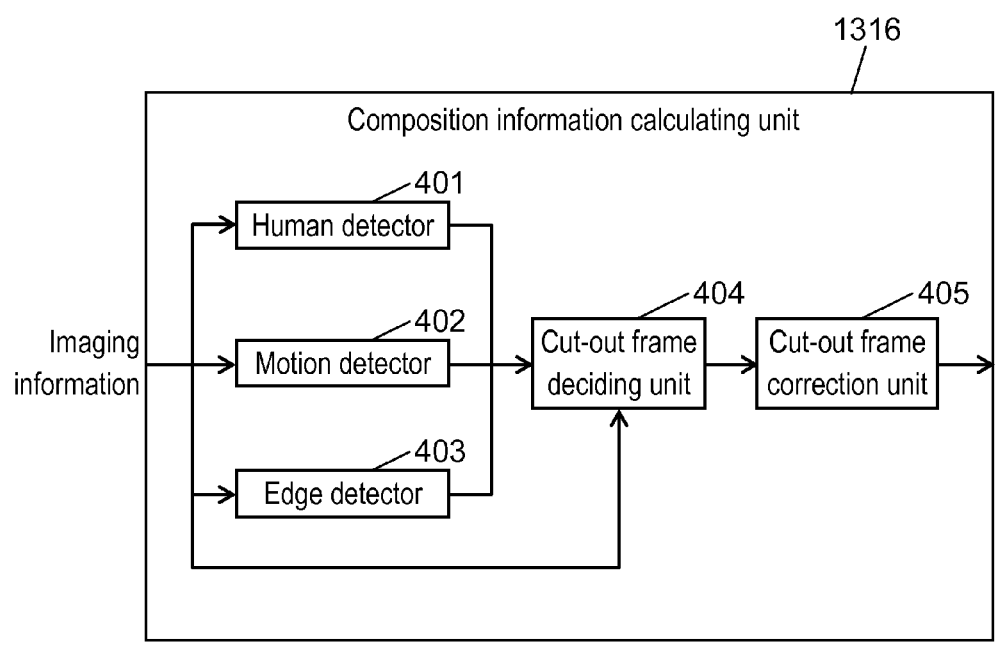
FIG. 12 is a block diagram showing details of a composition information calculating unit shown in FIG. 11.

FIG. 12 is a block diagram showing details of composition information calculating unit 1316.

Composition information calculating unit 1316 tentatively decides a cut-out frame by cut-out frame deciding unit 404, and then performs an interpolation process to the cut-out frame considering continuity of the cut-out frame between frames so that the cut-out image can be reproduced as a smooth image. The interpolation process performed to the cut-out frame may be spline interpolation or Lagrange interpolation.

Figure 13:
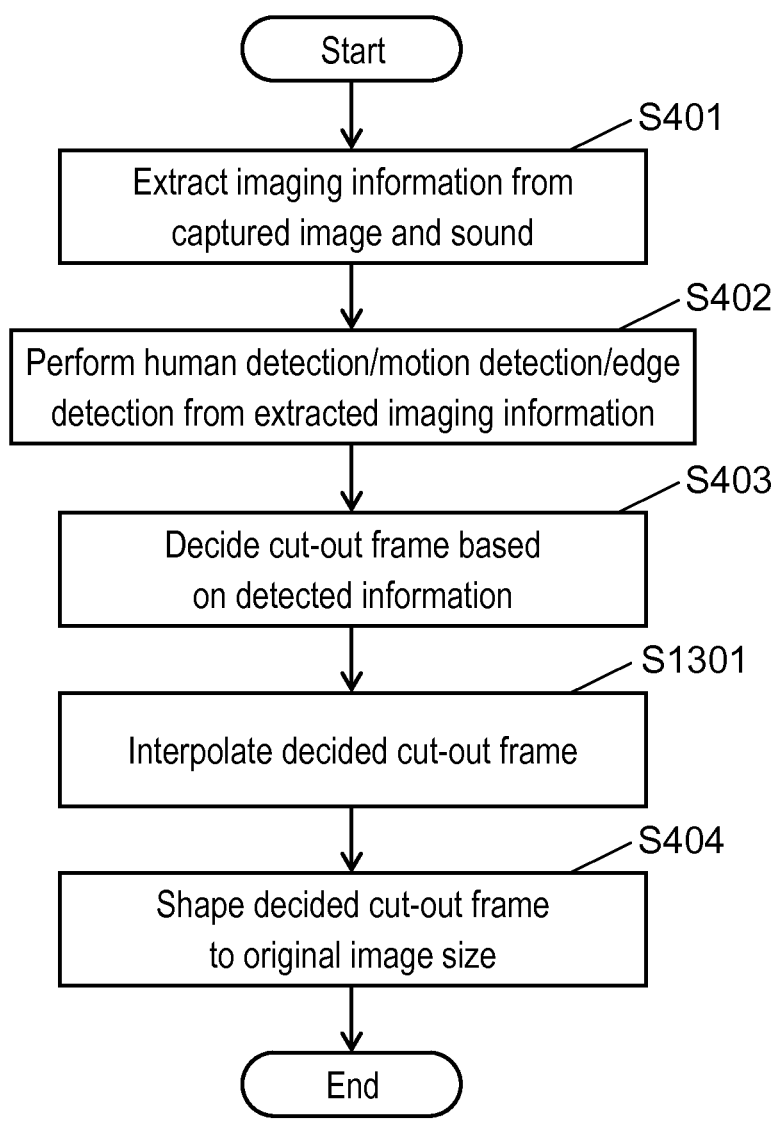
FIG. 13 is a flowchart explaining a procedure to cut out a part of image from a captured image and generate a new image in accordance with the second exemplary embodiment.

FIG. 13 is a flowchart explaining a procedure to cut out a part of image from a captured image and generate a new image. This flowchart is different from the flowchart of the first exemplary embodiment shown in FIG. 4 in that step 1301 is added between step S403 and step S404.

In step S1301, after a cut-out frame is tentatively decided by cut-out frame deciding unit 404, the cut-out frame is interpolated considering continuity of the cut-out frame between frames so that the cut-out image can be reproduced as a smooth image. The cut-out frame may be interpolated by using spline interpolation or Lagrange interpolation.

Figure 14:
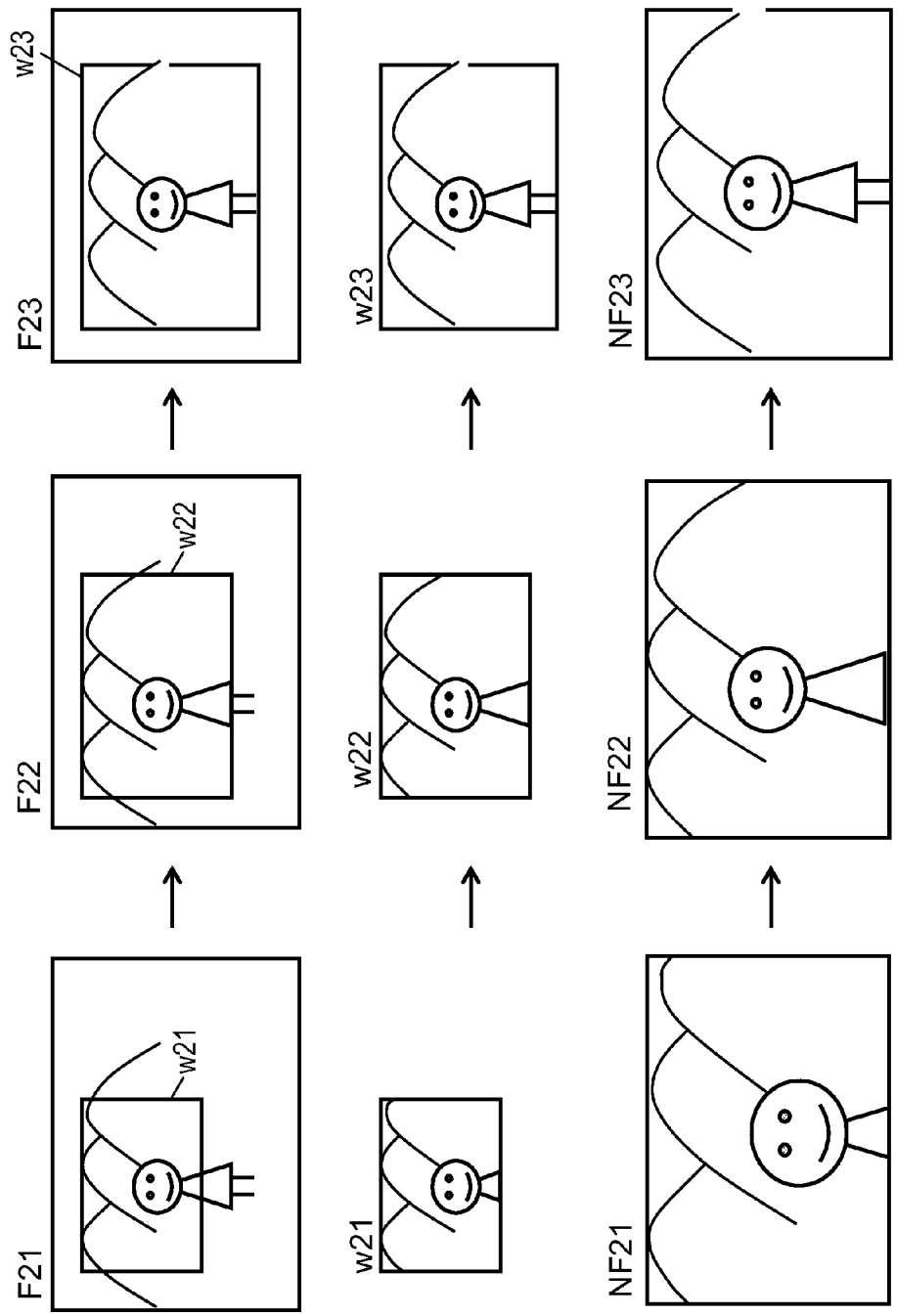
FIG. 14 is a diagram explaining an example of cutting out an image captured by video camera 100 in accordance with the first exemplary embodiment.
Figure 15:
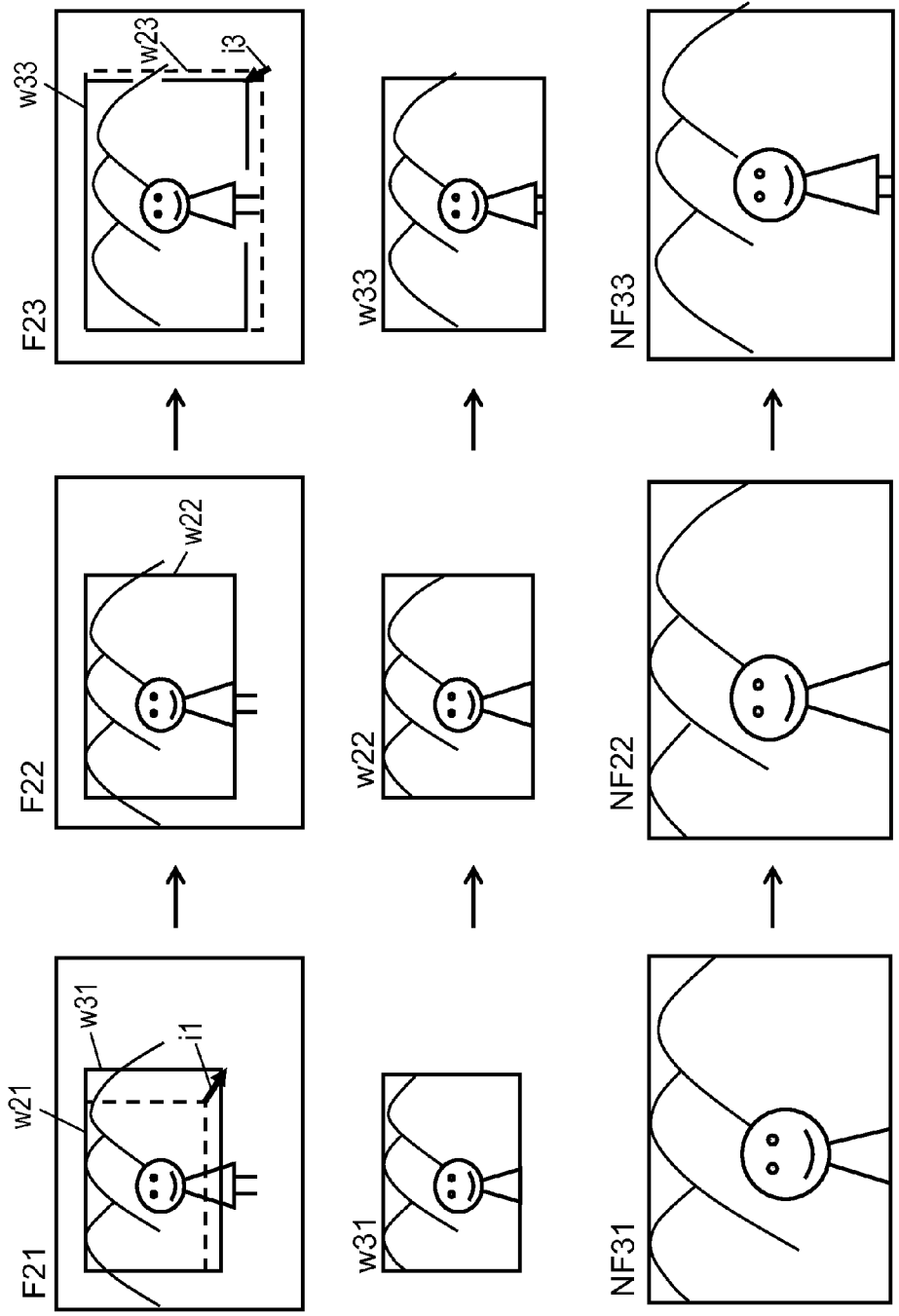
FIG. 15 is a diagram explaining an example of cutting out an image captured by video camera 1100 in accordance with the second exemplary embodiment.

Next, how the cut-out image changes will be described in a case where the cut-out frame is not interpolated and in a case where the cut-out frame is interpolated. FIG. 14 is a diagram explaining an example of cutting out an image captured by video camera 100, that is, in the case where the cut-out frame is not interpolated. FIG. 15 is a diagram explaining an example of cutting out an image captured by video camera 1100, that is, in the case where the cut-out frame is interpolated. The upper part in FIG. 14 shows an example of image captured by video camera 100 in the order of frame F21, frame F22 and frame F23. The upper part in FIG. 15 shows an example of image assumed to be captured by video camera 1100 in the same manner as video camera 100, or in the same order of frame F21, frame F22 and frame F23 as above. In the upper part of FIG. 14, cut-out frames are decided as described in the first exemplary embodiment. The decided cut-out frames are cut-out frame w21 in frame F21, cut-out frame w22 in frame F22 and cut-out frame w23 in frame F23. The middle part in FIG. 14 shows cut-out frames extracted from the respective frames shown in the upper part. The lower part in FIG. 14 shows a new image generated by enlarging the size of each of the extracted cut-out frames to the size of the originally captured image, or new frame NF21, new frame NF22 and new frame NF23.

In the newly generated image shown in FIG. 14, the size of the person changes rapidly between the frames. On the other hand, according to the present exemplary embodiment, a new image is generated so that the size of the person changes slowly. In the upper part of FIG. 15, cut-out frames are decided as described in the first exemplary embodiment. The cut-out frames decided at this time are not the fixed ones, but are tentative ones. The tentatively decided cut-out frames are cut-out frame w21 in frame F21, cut-out frame w22 in frame F22 and cut-out frame w23 in frame F23. Using cut-out frame w22 in frame F22 as a reference, cut-out frame w21 in frame F21 and cut-out frame w23 in frame F23 are interpolated. In the upper part in FIG. 15, cut-out frame w21 in frame F21 is interpolated in interpolation direction i1 to be cut-out frame w31. In the upper part in FIG. 15, cut-out frame w23 in frame F23 is interpolated in interpolation direction i3 to be cut-out frame w33. The middle part in FIG. 15 shows cut-out frames extracted from the respective frames shown in the upper part. The lower part in FIG. 15 shows a new image generated by enlarging the size of each of the extracted cut-out frames to the size of the originally captured image, or new frame NF31, new frame NF22 and new frame NF33. In this new image, the size of the person changes slowly between frames, or the image is smooth, compared to the new image shown in the lower part in FIG. 14.

In the manner as described above, video camera 1100 in accordance with the present exemplary embodiment cuts out a part of a captured image, and generates a new image. The new image is generated by cutting out an image from the captured image under constraint conditions stored in storage unit 302, and then interpolating the cut-out image between frames. Accordingly, the new image generated from the captured image becomes a more smooth and natural image without any skilled imaging techniques during capturing by video camera 1100.

Third Exemplary Embodiment

In a third exemplary embodiment, a description will be made on recording of an image newly generated from an image captured by a video camera.

In the first exemplary embodiment, the description has been made on the configuration that generates new image from an image captured by video camera 100 and records the new image. In the present exemplary embodiment, description will be made on a configuration that generates attribute information with respect to a new image without generating the new image.

Figure 16:
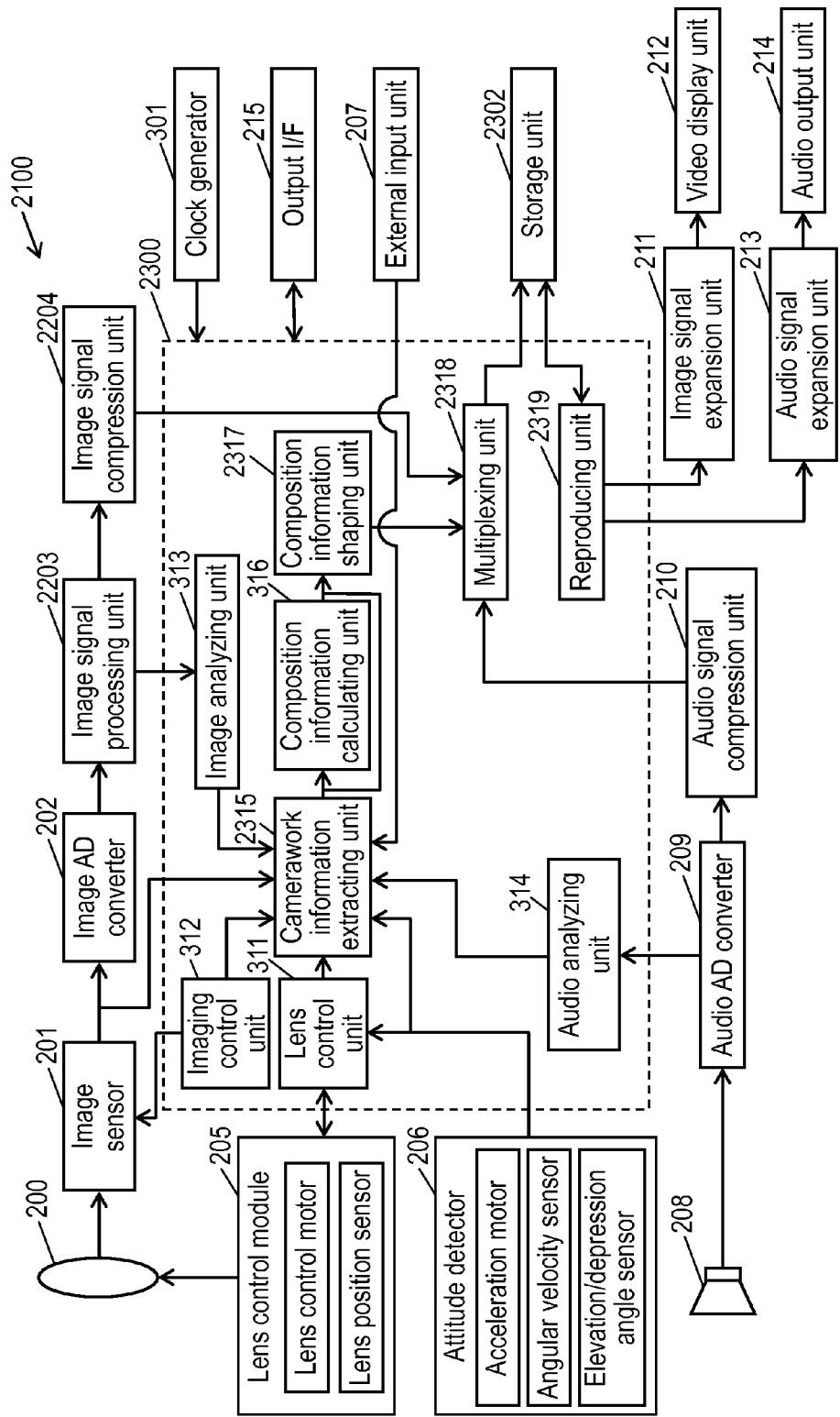
FIG. 16 is a block diagram showing an outline configuration of a video camera in accordance with a third exemplary embodiment.

FIG. 16 is a block diagram showing an outline configuration of video camera 2100 in accordance with the third exemplary embodiment. Video camera 2100 is different from video camera 100 of the first exemplary embodiment in that video camera 2100 records attribute information for generating a new image without generating the new image itself. Specifically, the basic configuration of video camera 2100 is the same as that of video camera 100. Accordingly, the same components as those of the first exemplary embodiment are indicated by the same reference marks, and the description of them will be omitted. A description will be made mainly on the parts different from the first exemplary embodiment.

Video camera 2100 is different from video camera 100 of the first exemplary embodiment in the configurations of image signal processing unit 2203, image signal compression unit 2204, control unit 2300 and storage unit 2302. Image signal processing unit 2203 is different from image signal processing unit 203 in that its output digital video signal is not input to composition information shaping unit 2317 of control unit 2300. This is because control unit 2300 does not generate a new image. Image signal compression unit 2204 is different from image signal compression unit 204 in that image signal compression unit 2204 does not receive any digital video signal output from control unit 2300. This is because control unit 2300 does not generate a new image.

Control unit 2300 is different from control unit 300 of the first exemplary embodiment in the configurations of camerawork information extracting unit 2315, composition information shaping unit 2317, multiplexing unit 2318 and reproducing unit 2319. Camerawork information extracting unit 2315 is different from camerawork information extracting unit 315 in that imaging information extracted by camerawork information extracting unit 2315 is input to composition information shaping unit 2317. Composition information shaping unit 2317 outputs, as the attribute information, imaging information extracted by camerawork information extracting unit 2315 and a cut-out frame decided by composition information calculating unit 316 to multiplexing unit 2318. Multiplexing unit 2318 records the attribute information together with the captured image in storage unit 2302. Reproducing unit 2319 performs reproduction of a new image based on the captured image and the attribute information recorded in storage unit 2302.

Figure 17:
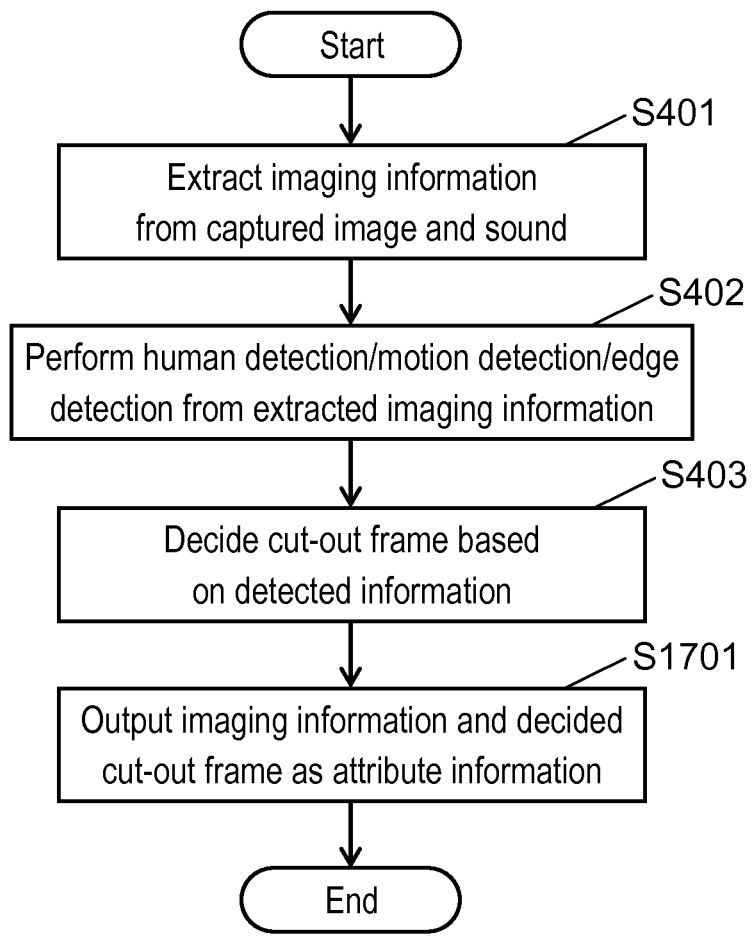
FIG. 17 is a flowchart explaining a procedure to cut out a part of image from a captured image and generate a new image in accordance with the third exemplary embodiment.

FIG. 17 is a flowchart explaining a procedure to cut out a part of image from a captured image and generate a new image in accordance with the third exemplary embodiment. This flowchart is different from the flowchart shown in FIG. 4 in that the step after step S403, in which a cut-out frame is decided, is changed from step S404 to step S1701. In step S1701, composition information shaping unit 2317 outputs, as the attribute information, imaging information extracted by camerawork information extracting unit 2315 and a cut-out frame decided by composition information calculating unit 316 to multiplexing unit 2318. Multiplexing unit 2318 multiplexes the captured image, the sound associated with the image, and the attribute information to a one data. The multiplexed data is recorded in storage unit 2302.

FIG. 18 is a diagram explaining an example of recording a captured image and the attribute information of an image that is to be newly generated. The attribute information is recorded together with the captured image data as information attached to the captured image data. The recorded attribute information includes the imaging information and the decided cut-out frame.

The decided cut-out frame can be expressed by information of horizontal and vertical offsets of an upper left corner of the cut-out frame from the upper left corner of the originally captured image, defined as a reference, and information of horizontal and vertical sizes of the cut-out frame.

Incidentally, it is not necessary to multiplex the attribute information with the captured image and the sound associated with the image. The attribute information may be individually retained as separate data from the captured image and the sound associated with the image, provided that they can be recorded in association with each other in storage unit 2302. The attribute information may be associated with the captured image and the sound associated with the image by, for example, generating another data indicating the relationship between the attribute information and, the captured image and the sound associated with the image. As another example, files of the attribute information and files of the captured image and the sound associated with the image may be treated as one group in a file system management for storing files in storage unit 2302, and stored under a same directory in the file system.

Also, although the attribute information is provided for only specific frames of the captured image in the example shown in FIG. 18, the present exemplary embodiment is not limited to this example. For example, the attribute information may be provided for all frames. As another example, a frame becoming a reference for encoding the captured image may be selected, and the attribute information may be provided for only the selected frame.

Further, the captured image, the sound associated with the image and the attribute information may be encoded after they have been multiplexed. To the contrary, the captured image and the sound associated with the image are encoded, and then the encoded image and the encoded sound associated with the image may be multiplexed with the attribute information. Further, the attribute information may be or may not be encoded.

As described above, video camera 2100 described in the present exemplary embodiment records, as attribute information including an image, imaging information of a captured image and a cut-out frame for cutting out a part of the captured image. Video camera 2100 reproduces a new image based on the recorded captured image and attribute information. This makes it possible to efficiently record and manage the captured image and the newly generated image.

INDUSTRIAL APPLICABILITY

The present disclosure is applicable to video cameras or the like that capture and record images.

REFERENCE MARKS IN THE DRAWINGS 100, 1100, 2100 video camera
200 lens group
201 image sensor
202 image AD converter
203, 2203 image signal processing unit
204, 2204 image signal compression unit
205 lens control module
206 attitude detector
207 external input unit
208 microphone
209 audio AD converter
210 audio signal compression unit
211 image signal expansion unit
212 video display unit
213 audio signal expansion unit
214 audio output unit
215 output I/F
300, 1300, 2300 control unit
301 clock generator
302, 2302 storage unit
311 lens control unit
312 imaging control unit
313 image analyzing unit
314 audio analyzing unit
315, 2315 camerawork information extracting unit
316, 1316 composition information calculating unit
317, 2317 composition information shaping unit
318, 2318 multiplexing unit
319, 2319 reproducing unit

The invention claimed is:
1. An image generating device comprising:
a human detector implemented by a processor that detects a human from a captured image;

a motion detector implemented by a processor that identifies a motion between frames from the captured image, each of the frames being a unit of an image;

a cut-out frame decider implemented by a processor that temporarily decides a cut-out frame for cutting out a new image from the detected human and the identified motion based on a constraint condition regarding a camerawork between the frames;

a cut-out frame corrector implemented by a processor that interpolates the cut-out frame to reproduce the new image smoothly; and a composition information shaper implemented by a processor that cuts out the new image from the captured image by using the cut-out frame interpolated by the cut-out frame corrector, and converts a size of the new image to a predetermined size.

2. The image generating device according to claim 1, wherein the constraint condition includes at least one of a horizontal moving time, a vertical moving time, a zoom-out time, and a zoom-in time.

3. An imaging device comprising:

an imaging system that captures an image; and the image generating device according to claim 1.

4. An image generating method comprising:

detecting a human from a captured image;

identifying a motion between frames from the captured image, each of the frames being a unit of an image;

temporarily deciding a cut-out frame for cutting out a new image from the detected human and the identified motion based on a constraint condition regarding a camerawork between the frames;

interpolating the cut-out frame to reproduce the new image smoothly; and cutting out the new image from the captured image by using the interpolated cut-out frame, and converting a size of the new image to a predetermined size.

5. A program stored on a non-transitory computer-readable medium for enabling a computer to perform a method comprising:

detecting a human from a captured image;

identifying a motion between frames from the captured image, each of the frames being a unit of an image;

temporarily deciding a cut-out frame for cutting out a new image from the detected human and the identified motion based on a constraint condition regarding a camerawork between the frames;

interpolating the cut-out frame to reproduce the new image smoothly; and cutting out the new image from the captured image by using the interpolated cut-out frame, and converting a size of the new image to a predetermined size.

* * * * *